(12) United States Patent
Oukhedou et al.

(10) Patent No.: US 9,080,629 B2
(45) Date of Patent: Jul. 14, 2015

(54) MULTI-TUNEABLE DEGRESSIVE VALVE

(75) Inventors: M'Hand Nait Oukhedou, Bree (BE); Gert Mangelschots, Heusden-Zolder (BE); Ward Opdekamp, Hasselt (BE); Werner Bosmans, Koersel (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 221 days.

(21) Appl. No.: 13/606,039

(22) Filed: Sep. 7, 2012

(65) Prior Publication Data

US 2014/0069753 A1 Mar. 13, 2014

(51) Int. Cl.
| | |
|---|---|
| F16F 9/19 | (2006.01) |
| F16F 9/516 | (2006.01) |
| F16F 9/18 | (2006.01) |
| F16F 7/09 | (2006.01) |
| F16F 9/348 | (2006.01) |

(52) U.S. Cl.
CPC . *F16F 9/19* (2013.01); *F16F 9/348* (2013.01); *F16F 9/516* (2013.01); *F16F 7/09* (2013.01); *F16F 9/185* (2013.01); *F16F 9/3485* (2013.01)

(58) Field of Classification Search
CPC .............. F16F 7/00; F16F 7/09; F16F 9/00; F16F 9/10; F16F 9/14; F16F 9/18; F16F 9/185; F16F 9/3214; F16F 9/34; F16F 9/348; F16F 9/3482; F16F 9/3484; F16F 9/3485
USPC ............ 188/313–317, 322.13–322.15, 282.5, 188/282.8
See application file for complete search history.

(56) References Cited

U.S. PATENT DOCUMENTS

| | | | |
|---|---|---|---|
| 3,945,474 A | 3/1976 | Palmer | |
| 4,076,276 A * | 2/1978 | Wijnhoven et al. | 267/64.11 |
| 4,352,417 A | 10/1982 | Stinson | |
| 5,123,671 A | 6/1992 | Driessen et al. | |
| 5,234,085 A | 8/1993 | Schneider | |
| 5,855,258 A * | 1/1999 | Deferme | 188/282.6 |
| 6,264,015 B1 | 7/2001 | De Kock | |
| 6,371,264 B1 | 4/2002 | Deferme | |
| 6,460,664 B1 | 10/2002 | Steed et al. | |
| 6,464,053 B1 | 10/2002 | Hoebrechts | |
| 7,040,468 B2 | 5/2006 | Shinata | |
| 7,070,029 B2 | 7/2006 | Deferme | |
| 2001/0009214 A1 | 7/2001 | Tanaka | |

(Continued)

FOREIGN PATENT DOCUMENTS

| | | | |
|---|---|---|---|
| JP | 2195041 A | * | 8/1990 |
| JP | 2283929 A | * | 11/1990 |

(Continued)

OTHER PUBLICATIONS

Search Report and Written Opinion dated Jul. 23, 2013 from corresponding PCT Application No. PCT/US2013/035751 (10 pages).

*Primary Examiner* — Melody Burch
(74) *Attorney, Agent, or Firm* — Harness, Dickey & Pierce, P.L.C.

(57) ABSTRACT

A shock absorber includes a piston disposed within a pressure tube. A valve assembly is attached to the piston. The valve assembly defines a first fluid flow through an always open fluid passage; a second fluid flow due to elastic deformation of a valve disc of the piston assembly; and a third fluid flow due to movement of the entire valve disc away from the piston. In one embodiment, the valve assembly is designed to be pre-assembled at an off-line and/or off-site location.

15 Claims, 12 Drawing Sheets

(56) References Cited

U.S. PATENT DOCUMENTS

2008/0236968 A1* 10/2008 Watanabe .................... 188/313
2009/0107782 A1* 4/2009 Ota et al. ................... 188/282.5

FOREIGN PATENT DOCUMENTS

| JP | 06-185562 | 7/1994 |
| WO | 2005/033548 | 4/2005 |

* cited by examiner

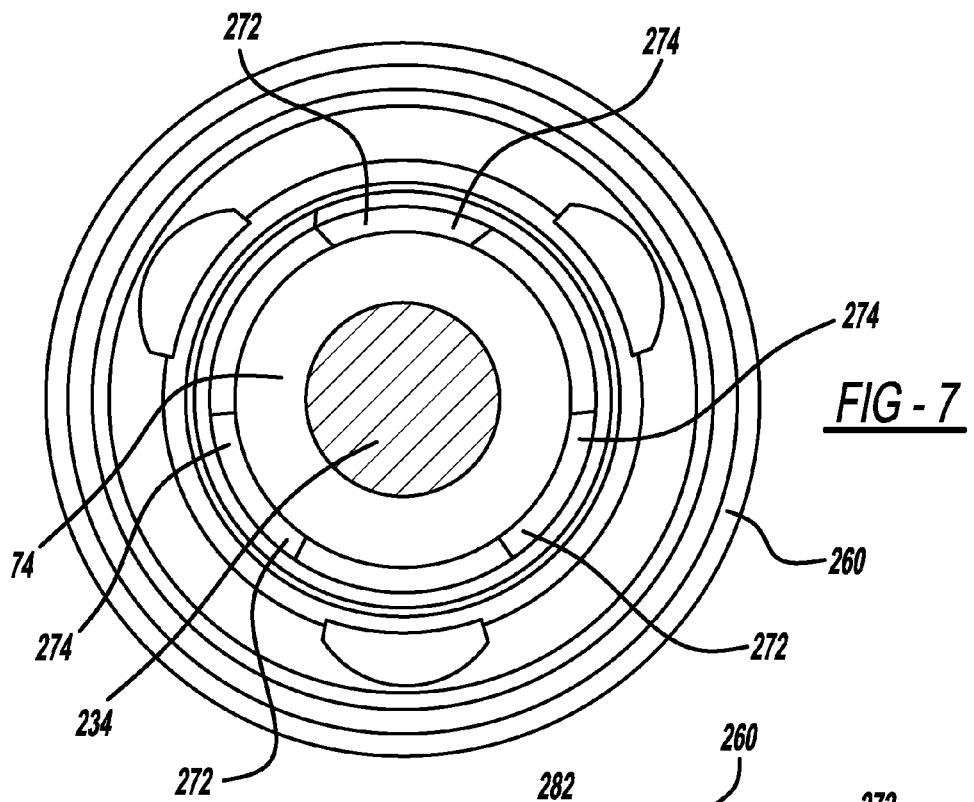
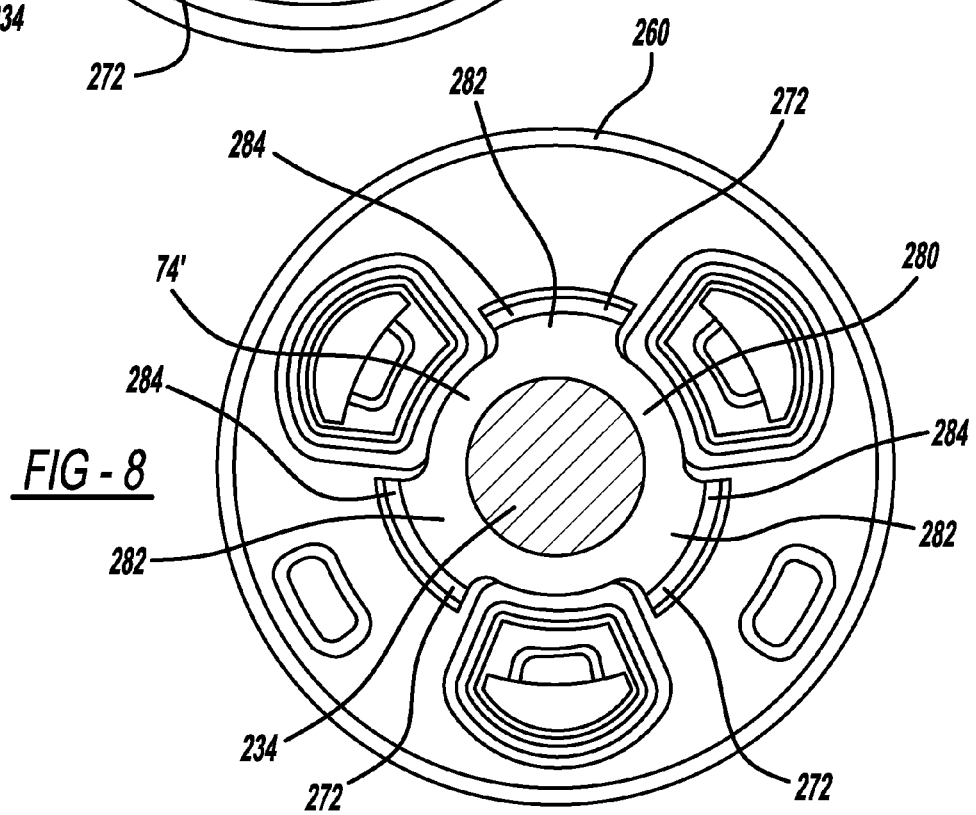

MULTI-TUNEABLE DEGRESSIVE VALVE

FIELD

The present disclosure relates generally to hydraulic dampers or shock absorbers for use in a suspension system such as a suspension system used for automotive vehicles. More particularly, the present disclosure relates to a multi-tuneable degressive valve which can generate damping forces in rebound and/or compression movement of the shock absorber.

BACKGROUND

This section provides background information related to the present disclosure which is not necessarily prior art.

Shock absorbers are used in conjunction with automotive suspension systems to absorb unwanted vibrations which occur during driving. To absorb the unwanted vibrations, shock absorbers are generally connected between the sprung portion (body) and the unsprung portion (suspension) of the automobile. A piston is located within a pressure tube of the shock absorber and the pressure tube is connected to one of the unsprung and sprung portions of the vehicle. The piston is connected to the other of the sprung portion and unsprung portion of the automobile through a piston rod which extends through the pressure tube. The piston divides the pressure tube into an upper working chamber and a lower working chamber both of which are filled with hydraulic fluid. Because the piston is able, through valving, to limit the flow of the hydraulic fluid between the upper and the lower working chambers when the shock absorber is compressed or extended, the shock absorber is able to produce a damping force which counteracts the vibration which would otherwise be transmitted from the unsprung portion to the sprung portion of the vehicle. In a dual-tube shock absorber, a fluid reservoir or reserve chamber is defined between the pressure tube and a reserve tube. A base valve is located between the lower working chamber and the reserve chamber to also produce a damping force which counteracts the vibrations which would otherwise be transmitted from the unsprung portion of the vehicle to the sprung portion of the automobile.

As described above, for a dual-tube shock absorber, the valving on the piston limits the flow of damping fluid between the upper and lower working chambers when the shock absorber is extended to produce a damping load. The valving on the base valve limits the flow of damping fluid between the lower working chamber and the reserve chamber when the shock absorber is compressed to produce a damping load. For a mono-tube shock absorber, the valving on the piston limits the flow of damping fluid between the upper and lower working chambers when the shock absorber is extended or compressed to produce a damping load. During driving, the suspension system moves in jounce (compression) and rebound (extension). During jounce movements, the shock absorber is compressed causing damping fluid to move through the base valve in a dual-tube shock absorber or through the piston valve in a mono-tube shock absorber. A damping valve located on the base valve or the piston controls the flow of damping fluid and thus the damping force created. During rebound movements, the shock absorber is extended causing damping fluid to move through the piston in both the dual-tube shock absorber and the mono-tube shock absorber. A damping valve located on the piston controls the flow of damping fluid and thus the damping force created.

In a dual-tube shock absorber, the piston and the base valve normally include a plurality of compression passages and a plurality of extension passages. During jounce movements in a dual-tube shock absorber, the damping valve or the base valve opens the compression passages in the base valve to control fluid flow and produce a damping load. A check valve on the piston opens the compression passages in the piston to replace damping fluid in the upper working chamber but this check valve may or may not contribute to the damping load. The damping valve on the piston closes the extension passages of the piston and a check valve on the base valve closes the extension passages of the base valve during a compression movement. During rebound movements in a dual-tube shock absorber, the damping valve on the piston opens the extension passages in the piston to control fluid flow and produce a damping load. A check valve on the base valve opens the extension passages in the base valve to replace damping fluid in the lower working chamber but this check valve may or may not contribute to the damping load.

In a mono-tube shock absorber, the piston normally includes a plurality of compression passages and a plurality of extension passages. The shock absorber will also include means for compensating for the rod volume flow of fluid as is well known in the art. During jounce movements in a mono-tube shock absorber, the compression damping valve on the piston opens the compression passages in the piston to control fluid flow and produce a damping load. The extension damping valve on the piston closes the extension passages of the piston during a jounce movement. During rebound movements in a mono-tube shock absorber, the extension damping valve on the piston opens the extension passages in the piston to control fluid flow and produce a damping load. The compression damping valve on the piston closes the compression passages of the piston during a rebound movement.

SUMMARY

This section provides a general summary of the disclosure, and is not a comprehensive disclosure of its full scope or all of its features.

The present disclosure relates to a hydraulic damper or shock absorber which includes a multi-tuneable degressive valve assembly which includes a flexing disc set including an orifice disc to tune low speed damping and which can control the steepness of the force curve at low velocities fluid flow through an orifice in the orifice disc defines a first stage of damping. The flexing disc set will bend open over a fulcrum disc to define a second stage of damping. The flexing disc set is preloaded against a surface of the valve body by one or more disc springs. The entire flexing disc set will move axially or generally perpendicular to the surface of the valve body to define a third stage of damping. The multi-tuneable degressive valve assembly of the present disclosure can be used on both sides of the valve body of the piston assembly in a mono-tube shock absorber or on both the valve body of the piston assembly and on the valve body of the base valve assembly for a dual-tube shock absorber assembly. The multi-tuneable degressive valve assembly of the present disclosure can be designed to be pre-assembled as a valve assembly at an off-line or off-site facility.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a plan view of the valve body including a high speed restriction disc;

FIG. 8 is a plan view of the valve body including a high speed restriction disc in accordance with another embodiment of the disclosure;

DETAILED DESCRIPTION

Figure 1:
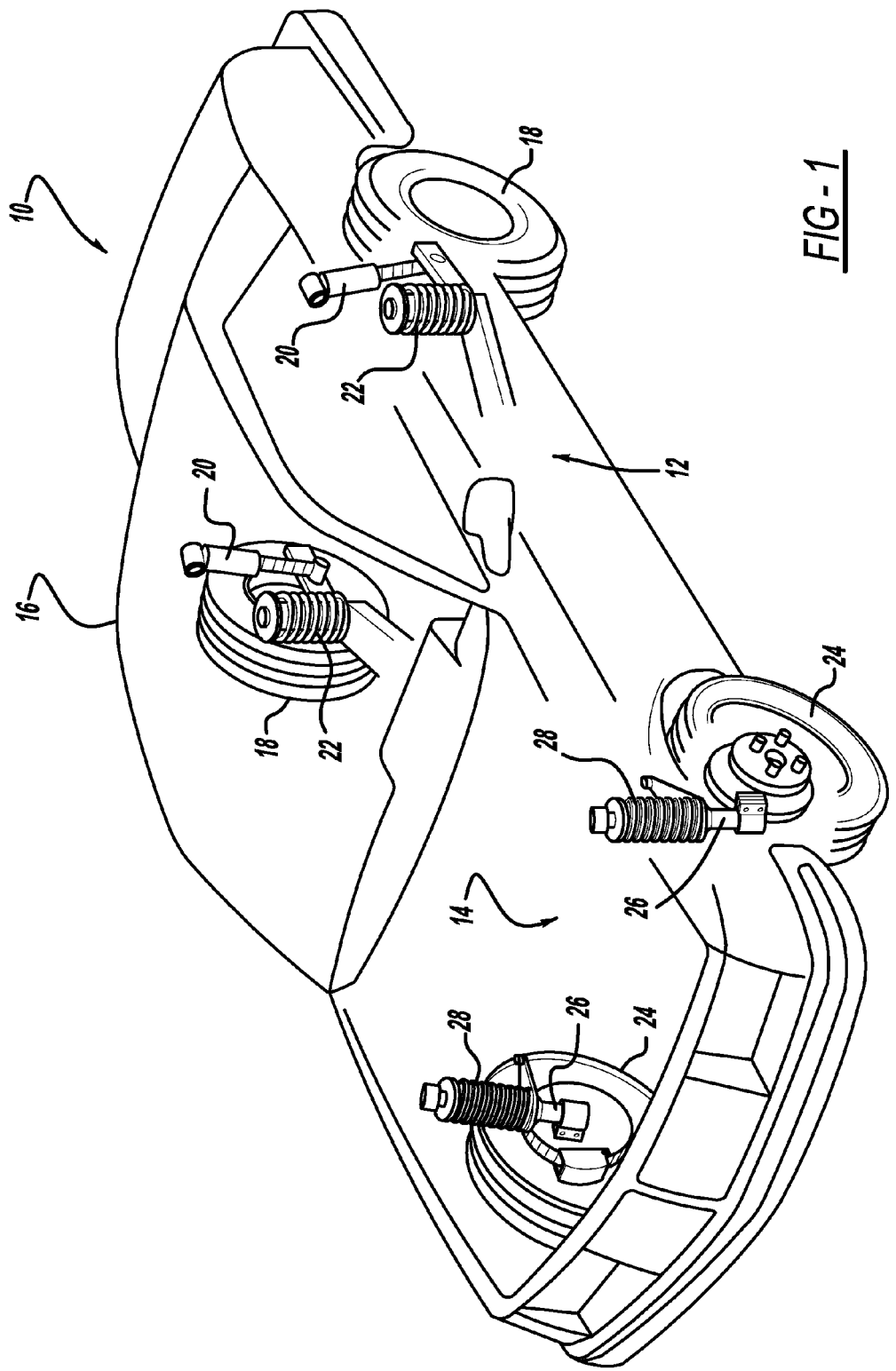
FIG. 1 is an illustration of an automobile having shock absorbers which incorporate the valve design in accordance with the present disclosure.

The following description is merely exemplary in nature and is not intended to limit the present disclosure, application, or uses. There is shown in FIG. 1 a vehicle incorporating a suspension system having shock absorbers, each of which incorporates a piston assembly in accordance with the present invention, and which is designated generally by the reference numeral 10. Vehicle 10 includes a rear suspension 12, a front suspension 14 and a body 16. Rear suspension 12 has a transversely extending rear axle assembly (not shown) adapted to operatively support a pair of rear wheels 18. The rear axle is attached to body 16 by means of a pair of shock absorbers 20 and by a pair of springs 22. Similarly, front suspension 14 includes a transversely extending front axle assembly (not shown) to operatively support a pair of front wheels 24. The front axle assembly is attached to body 16 by means of a pair of shock absorbers 26 and by a pair of springs 28. Shock absorbers 20 and 26 serve to dampen the relative motion of the unsprung portion (i.e., front and rear suspensions 12, 14) with respect to the sprung portion (i.e., body 16) of vehicle 10. While vehicle 10 has been depicted as a passenger car having front and rear axle assemblies, shock absorbers 20 and 26 may be used with other types of vehicles or in other types of applications including, but not limited to, vehicles incorporating non-independent front and/or non-independent rear suspensions, vehicles incorporating independent front and/or independent rear suspensions or other suspension systems known in the art. Further, the term "shock absorber" as used herein is meant to refer to dampers in general and thus will include McPherson struts and other damper designs known in the art.

Figure 2:
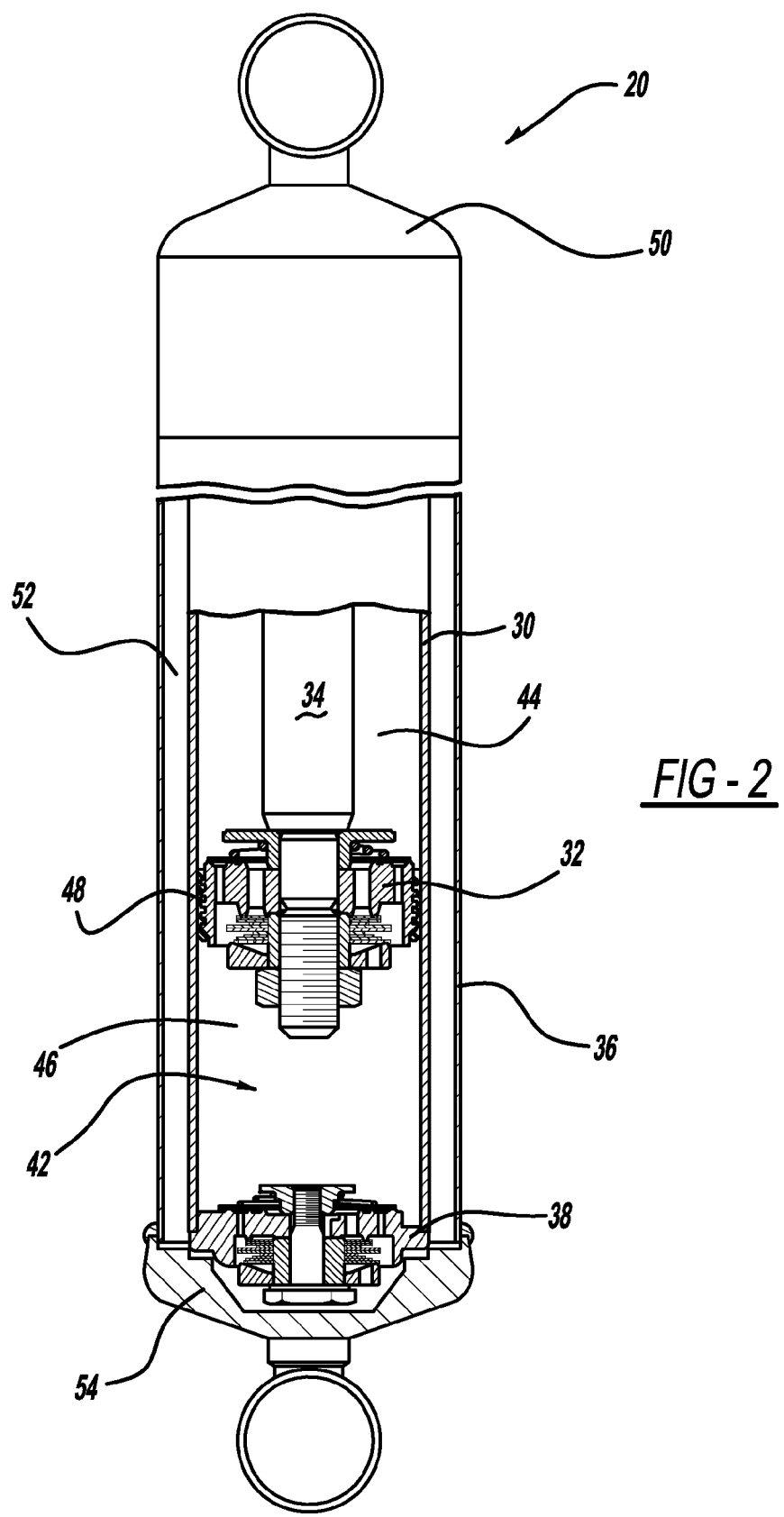
FIG. 2 is a side view, partially in cross-section of a dual-tube shock absorber from FIG. 1 which incorporates the valve design in accordance with the present disclosure.

Referring now to FIG. 2, shock absorber 20 is shown in greater detail. While FIG. 2 illustrates only shock absorber 20, it is to be understood that shock absorber 26 also includes the valve design described below for shock absorber 20. Shock absorber 26 only differs from shock absorber 20 in the manner in which it is adapted to be connected to the sprung and unsprung masses of vehicle 10. Shock absorber 20 comprises a pressure tube 30, a piston assembly 32, a piston rod 34, a reserve tube 36 and a base valve assembly 38.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system seals the interface between upper end cap 50, reserve tube 36, pressure tube 30 and piston rod 34. The end of piston rod 34 opposite to piston assembly 32 is adapted to be secured to one of the sprung and unsprung mass of vehicle 10. Valving within piston assembly 32 controls the movement of fluid between upper working chamber 44 and lower working chamber 46 during movement of piston assembly 32 within pressure tube 30. Because piston rod 34 extends only through upper working chamber 44 and not lower working chamber 46, movement of piston assembly 32 with respect to pressure tube 30 causes a difference in the amount of fluid displaced in upper working chamber 44 and the amount of fluid displaced in lower working chamber 46. The difference in the amount of fluid displaced is known as the "rod volume" and it flows through base valve assembly 38. Reserve tube 36 surrounds pressure tube 30 to define a reservoir chamber 52. An end cap 54 seals the end of reserve tube 36. End cap 54 is adapted to be secured to the other of the sprung and unsprung mass of vehicle 10. Base valve assembly 38 controls fluid flow between lower working chamber 46 and reservoir chamber 52.

Figure 3:
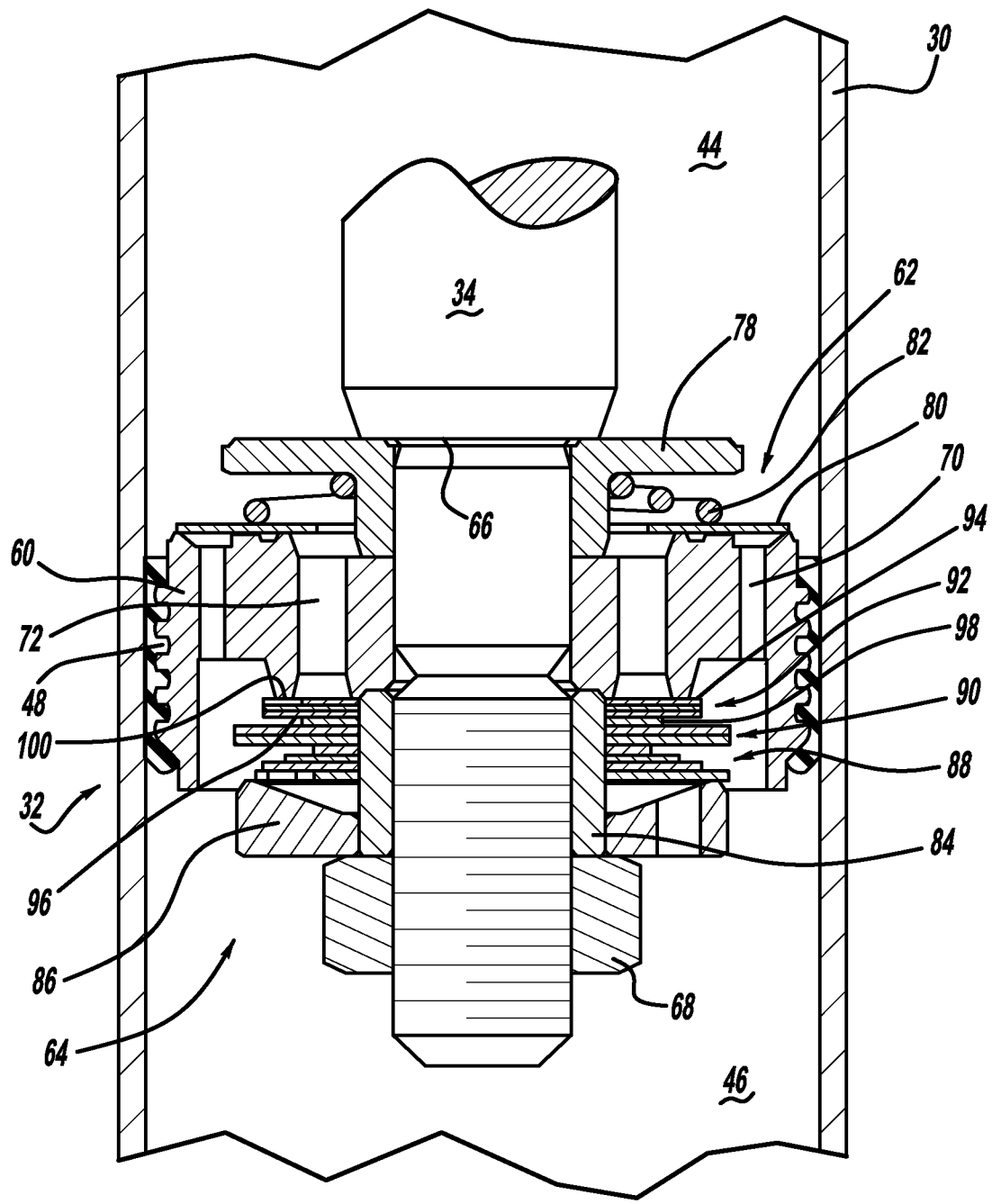
FIG. 3 is an enlarged side view, partially in cross-section, of the piston assembly from the shock absorber illustrated in FIG. 2.

Referring now to FIG. 3, piston assembly 32 comprises a valve body 60, a compression valve assembly 62 and a rebound valve assembly 64. Compression valve assembly 62 is assembled against a shoulder 66 on piston rod 34. Valve body 60 is assembled against compression valve assembly 62 and rebound valve assembly 64 is assembled against valve body 60. A nut 68 secures these components to piston rod 34.

Valve body 60 defines a plurality of compression passages 70 and a plurality of rebound passages 72. Seal 48 includes a plurality of ribs which mate with a plurality of annular grooves to permit sliding movement of piston assembly 32.

Compression valve assembly 62 comprises a retainer 78, a valve disc 80 and a spring 82. Retainer 78 abuts shoulder 66 on one end and valve body 60 on the other end. Valve disc 80 abuts valve body 60 and closes compression passages 70 while leaving rebound passages 72 open. Spring 82 is disposed between retainer 78 and valve disc 80 to bias valve disc 80 against valve body 60. During a compression stroke, fluid in lower working chamber 46 is pressurized causing fluid pressure to react against valve disc 80. When the fluid pressure against valve disc 80 overcomes the biasing load of spring 82, valve disc 80 separates from valve body 60 to open compression passages 70 and allow fluid flow from lower working chamber 46 to upper working chamber 44. Typically spring 82 only exerts a light load on valve disc 80 and compression valve assembly 62 acts as a check valve between chambers 46 and 44. The damping characteristics for shock absorber 20 during a compression stroke are typically controlled by base valve assembly 38 which accommodates the flow of fluid from lower working chamber 46 to reservoir chamber 52 due to the "rod volume" concept but compression valve assembly 62 can also contribute to the damping characteristics for shock absorber 20. During a rebound stroke, compression passages 70 are closed by valve disc 80.

Rebound valve assembly 64 comprises a guiding sleeve 84, a valve interface 86, a plurality of disc springs 88, a plurality of shim discs 90 and a plurality of flexing discs (biasing member) 92. Guiding sleeve 84 is slidingly or threadingly received on piston rod 34 and is disposed between valve body 60 and nut 68. Valve interface 86, the plurality of disc springs 88, the plurality of shim discs 90 and the plurality of flexing discs 92 are all slidingly received on the outside diameter of guiding sleeve 84. Valve interface 86 directly engages nut 68, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 60. While valve interface 86 is illustrated as being integral with guiding sleeve 84 in FIG. 6, valve interface 86 can be separate from guiding sleeve 84 such that valve interface 86 is slidably received on guiding sleeve 84 similar to FIG. 3. The separate components make it possible to adjust the preload of the plurality of disc springs 88 by moving valve interface 86 axially along guiding sleeve 84. Once the appropriate preload of the plurality of disc springs 88 has been achieved, valve interface 86 can be shimmed, crimped, staked, welded or otherwise attached to guiding sleeve 84 as is well known in the art. Another option would be to have valve interface 86 press fit on guiding sleeve 84.

Valve interface 86 provides support for the plurality of disc springs 88, the plurality of shim discs 90 and the plurality of flexing discs 92. The plurality of disc springs 88 elastically flex or bend to provide a specified load which biases the plurality of flexing discs 92 against valve body 60. The plurality of shim discs 90 are provided to adjust or determine the amount of flexing of the plurality of flexing discs 92 and thus they adjust or determine the amount of the specified load which biases the plurality of flexing discs 92 against valve body 60.

The plurality of flexing discs 92 include an orifice disc 94 directly abutting valve body 60, one or more tuned discs 96 and a fulcrum disc 98. When fluid pressure is applied to the plurality of flexing discs 92, a first or initial flow of fluid will flow through an optional orifice 100 defined by orifice disc 94 or valve body 60. This first or initial flow of fluid is used to tune the low speed damping and can control the steepness of the force versus velocity curve at low velocities of piston assembly 32. The number, diameter and thickness of the one or more tuned discs 96 controls the transition between low and medium velocities of piston assembly 32. Orifice disc 94 and the one or more tuned discs 96 will elastically defect or bend at fulcrum disc 98 to allow a second or additional fluid flow at the medium velocities of piston assembly 32. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a rebound stroke, fluid in upper working chamber 44 is pressurized causing fluid pressure to react against the plurality of flexing discs 92. A first initial flow of fluid will flow through orifice 100 in orifice disc 94 at low velocities of piston assembly 32. As the velocity of piston assembly 32 increases, fluid pressure reacting against the plurality of flexing discs 92 increases and eventually overcomes the bending load for the plurality of flexing discs 92 and the plurality of flexing discs 92 elastically deflect opening the plurality of rebound passages 72 allowing a second fluid flow from upper working chamber 44 to lower working chamber 46. The design and strength of the plurality of flexing discs 92 and the size of the plurality of rebound passages 72 will determine the damping characteristics for shock absorber 20 in rebound. As the velocity of piston assembly 32 increases further, the fluid pressure within upper working chamber 44 reaches a predetermined level and the fluid pressure will cause the plurality of flexing discs 92 to lift-off of valve body 60. The lift-off of the plurality of flexing discs 92 causes the plurality of flexing discs 92, the plurality of shim discs 90 and the plurality of disc springs 88 to move axially along the outer diameter of guiding sleeve 84 fully opening rebound passages 72 creating a third fluid flow.

Figure 4:
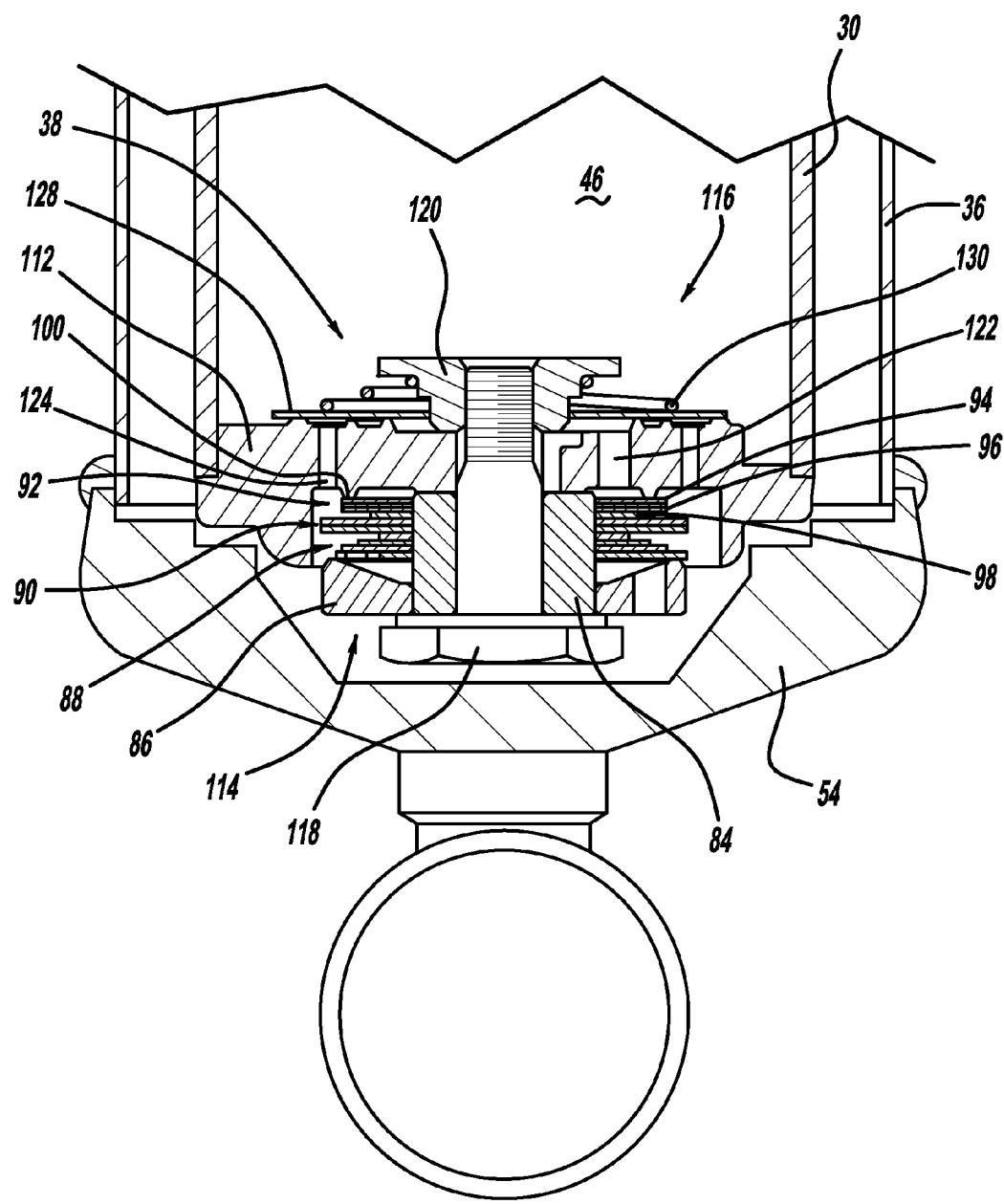
FIG. 4 is an enlarged side view, partially in cross-section of the base valve assembly from the shock absorber illustrated in FIG. 2.

Referring to FIG. 4, base valve assembly 38 comprises a valve body 112, a compression valve assembly 114 and a rebound valve assembly 116. Compression valve assembly 114 and rebound valve assembly 116 are attached to valve body 112 using a bolt 118 and a nut 120. The tightening of nut 120 biases compression valve assembly 114 towards valve body 112. Valve body 112 defines a plurality of compression passages 122 and a plurality of rebound passages 124.

Rebound valve assembly 116 comprises a valve disc 128 and a valve spring 130. Valve disc 128 abuts valve body 112 and closes rebound passages 124. Valve spring 130 is disposed between nut 120 and valve disc 128 to bias valve disc 128 against valve body 112. During a rebound stroke, fluid in lower working chamber 46 is reduced in pressure causing fluid pressure in reservoir chamber 52 to react against valve disc 128. When the fluid pressure against valve disc 128 overcomes the biasing load of valve spring 130, valve disc 128 separates from valve body 112 to open rebound passages 124 and allow fluid flow from reservoir chamber 52 to lower working chamber 46. Typically valve spring 130 exerts only a light load on valve disc 128 and compression valve assembly 114 acts as a check valve between reservoir chamber 52 and lower working chamber 46. The damping characteristics for a rebound stroke are controlled by rebound valve assembly 64 as detailed below but rebound valve assembly 116 can be designed to contribute to the damping characteristics.

Compression valve assembly 114 is the same as rebound valve assembly 64 but it is attached to valve body 112 to control fluid flow from lower working chamber 46 to reservoir chamber 52 during a compression stroke of shock absorber 20.

Compression valve assembly 114 comprises guiding sleeve 84, valve interface 86, the plurality of disc springs 88, the plurality of shim discs 90 and the plurality of flexing discs 92. Guiding sleeve 84 is slidingly or threadingly received on bolt 118 and is disposed between valve body 112 and the head of bolt 118. Valve interface 86, the plurality of disc springs 88, the plurality of shim discs 90 and the plurality of flexing discs 92 are all slidingly received on the outside diameter of guiding sleeve 84. Valve interface 86 directly engages bolt 118, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 112. As illustrated in FIG. 4, valve interface 86 is separate from guiding sleeve 84 such that valve interface 86 is slidably received on guiding sleeve 84 similar to FIG. 3. This makes it possible to adjust the preload of the plurality of disc springs 88 by moving valve interface axially along guiding sleeve 84. Once the appropriate preload of the plurality of disc springs 88 has been achieved, valve interface 86 can be shimmed, crimped, staked, welded or otherwise attached to guiding sleeve 84 as is well known in the art. Another option would be to have valve interface 86 press fit on guiding sleeve 84.

Valve interface 86 provides support for the plurality of disc springs 88, the plurality of shim discs 90 and the plurality of flexing discs 92. The plurality of disc springs 88 flex or bend to provide a specified load which biases the plurality of flexing discs 92 against valve body 112. The plurality of shim discs 90 are provided to adjust or determine the amount of flexing of the plurality of flexing discs 92 and thus they adjust or determine the amount of the specified load which biases the plurality of flexing discs 92 against valve body 112.

The plurality of flexing discs 92 include orifice disc 94 directly abutting valve body 112, the one or more tuned discs 96 and fulcrum disc 98. When fluid pressure is applied to the plurality of flexing discs 92, a first or initial flow of fluid will flow through orifice 100 defined by orifice disc 94 or valve body 112. This first or initial flow of fluid is used to tune the low speed damping and can control the steepness of the force versus velocity curve at low velocities of piston assembly 32. The number, diameter and thickness of the one or more tuned discs 96 controls the transition between low and medium velocities of piston assembly 32. Orifice disc 94 and the one or more tuned discs 96 will defect or bend to allow a second or additional fluid flow at the medium velocities of piston assembly 32. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a compression stroke, fluid in lower working chamber 46 is pressurized causing fluid pressure to react against the plurality of flexing discs 92. A first or initial flow of fluid will flow through orifice 100 in orifice disc 94 at low velocities of piston assembly 32. As the velocity of piston assembly 32 increases, fluid pressure reacting against the plurality of flexing discs 92 increases and eventually overcomes the bending load for the plurality of flexing discs 92 and the plurality of flexing discs 92 elastically deflect opening the plurality of compression passages 122 allowing a second fluid flow from lower working chamber 46 to reservoir chamber 52. The design and strength of the plurality of flexing discs 92 and the size of the plurality of compression passages 122 will determine the damping characteristics for shock absorber 20 in compression. As the velocity of piston assembly 32 increases further, the fluid pressure within lower working chamber 46 reaches a predetermined level and the fluid pressure will cause the plurality of flexing discs 92 to lift-off of valve body 112. The lift-off of the plurality of flexing discs 92 causes the plurality of flexing discs 92, the plurality of shim discs 90 and the plurality of disc springs 88 to move axially along the outer diameter of guiding sleeve 84 to fully open compression passages 122 creating a third fluid flow.

Figure 5:
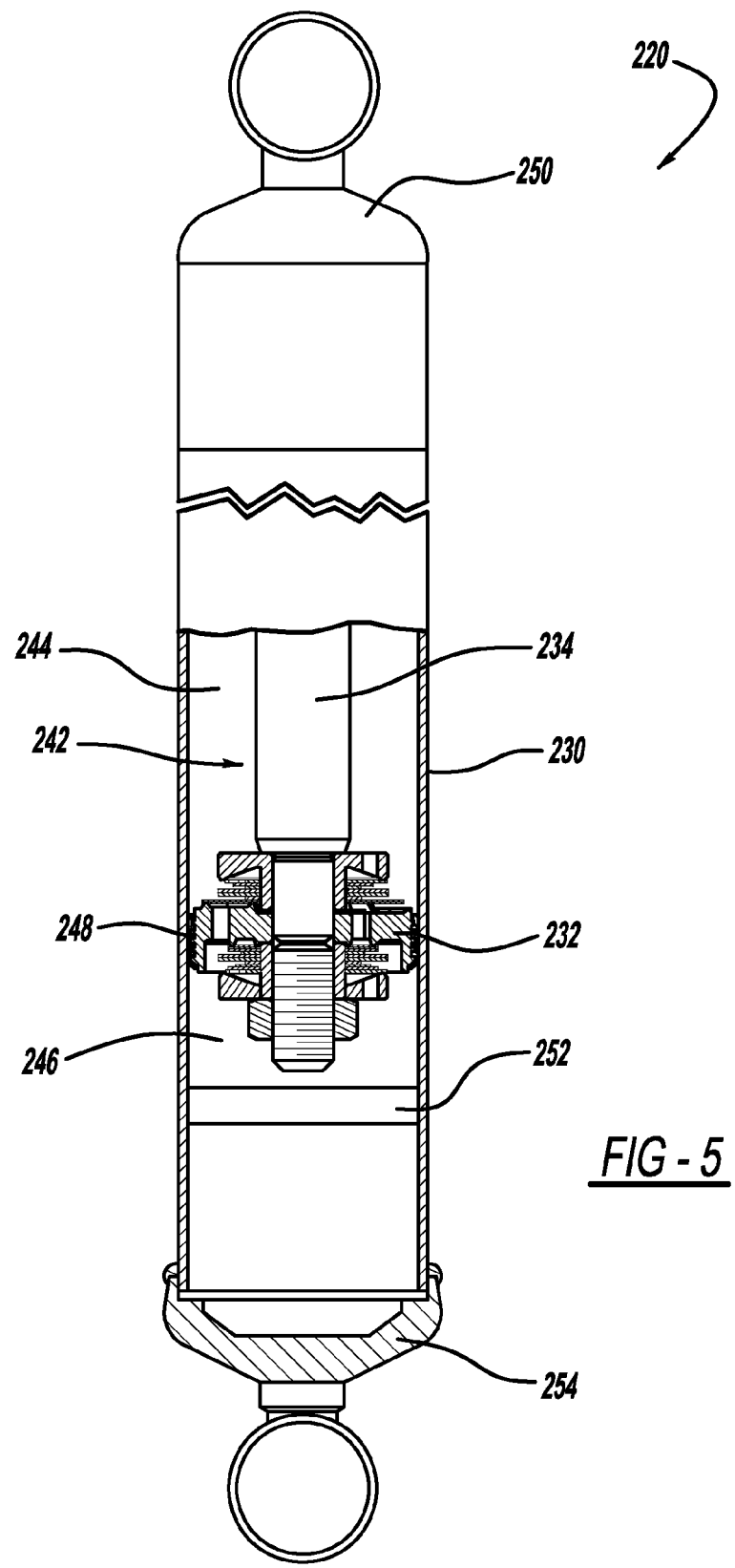
FIG. 5 is a side view, partially in cross-section, of a mono-tube shock absorber which incorporates the valve design in accordance with the present disclosure.

Referring now to FIG. 5, a shock absorber 220 in accordance with another embodiment of the present disclosure is illustrated. Shock absorber 220 is a mono-tube designed shock absorber comprising a pressure tube 230, a piston assembly 232 and a piston rod 234.

Pressure tube 230 defines a fluid chamber 242. Piston assembly 232 is slidably disposed within pressure tube 230 and divides fluid chamber 242 into an upper working chamber 244 and a lower working chamber 246. A seal 248 is disposed between piston assembly 232 and pressure tube 230 to permit sliding movement of piston assembly 232 with respect to pressure tube 230 without generating undue frictional forces as well as sealing upper working chamber 244 from lower working chamber 246. Piston rod 234 is attached to piston assembly 232 and extends through upper working chamber 244 and through an upper end cap 250 which closes the upper end of pressure tube 230. A sealing system seals the interface between upper end cap 250, pressure tube 230 and piston rod 234. The end of piston rod 234 opposite to piston assembly 232 is adapted to be secured to the one of sprung and unsprung mass of vehicle 10. Valving within piston assembly 232 controls the movement of fluid between upper working chamber 244 and lower working chamber 246 during movement of piston assembly 232 within pressure tube 230. Because piston rod 234 extends only through upper working chamber 244 and not lower working chamber 246, movement of piston assembly 232 with respect to pressure tube 230 causes a difference in the amount of fluid displaced in upper working chamber 244 and the amount of fluid displaced in lower working chamber 246. The difference in the amount of fluid displaced is known as the "rod volume" and it is accommodated for by the use of a floating piston 252 as is well known in the art. An end cap 254 seals the end of pressure tube 230. End cap 254 is adapted to be secured to the other of the sprung and unsprung mass of vehicle 10.

Figure 6:
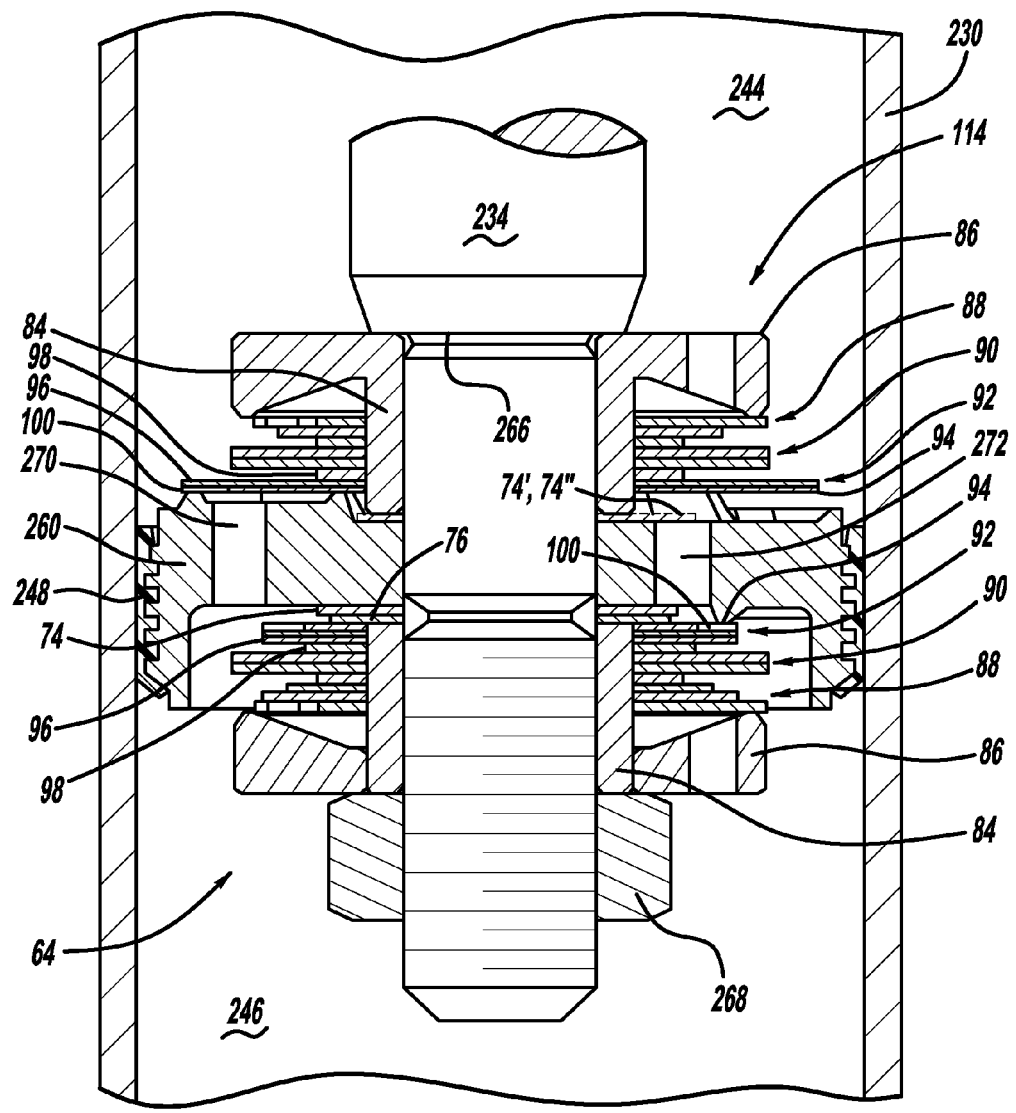
FIG. 6 is an enlarged side view, partially in cross-section of the piston assembly shown in FIG. 5.

Referring now to FIG. 6, piston assembly 232 comprises a valve body 260, compression valve assembly 114 and rebound valve assembly 64. Compression valve assembly 114 is assembled against a shoulder 266 on piston rod 234. Valve body 260 is assembled against compression valve assembly 114 and rebound valve assembly 64 is assembled against valve body 260. A nut 268 secures these components to piston rod 234.

Valve body 260 defines a plurality of compression passages 270 and a plurality of rebound passages 272. Seal 248 includes a plurality of ribs which mate with a plurality of annular grooves to permit sliding movement of piston assembly 232.

Compression valve assembly 114 comprises guiding sleeve 84, valve interface 86, the plurality of disc springs 88, the plurality of shim discs 90 and the plurality of flexing discs 92. As illustrated, guiding sleeve 84 and valve interface 86 are a single component. Guiding sleeve 84 is slidingly or threadingly received on piston rod 234 and is disposed between shoulder 266 on piston rod 234 and valve body 260. The plurality of disc springs 88, the plurality of shim discs 90 and the plurality of flexing discs 92 are all slidingly received on the outside diameter of guiding sleeve 84. Valve interface 86 directly engages shoulder 266, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 260.

Valve interface 86 provides support for the plurality of disc springs 88, the plurality of shim discs 90 and the plurality of flexing discs 92. The plurality of disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 232. The number, diameter and thickness of the one or more tuned discs 96 controls the transition between low and medium velocities of piston assembly 232. Orifice disc 94 and the one or more tuned discs 96 will defect or bend to allow a second or additional fluid flow at the medium velocities of piston assembly 232. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a compression stroke, fluid in lower working chamber 246 is pressurized causing fluid pressure to react against the plurality of flexing discs 92. A first or initial flow of fluid will flow through orifice 100 in orifice disc 94 at low velocities of piston assembly 232. As the velocity of piston assembly 232 increases, fluid pressure reacting against the plurality of flexing discs 92 increases and eventually overcomes the bending load for the plurality of flexing discs 92 and the plurality of flexing discs 92 elastically deflect opening the plurality of compression passages 270 allowing a second fluid flow from lower working chamber 246 to upper working chamber 244. The design and strength of the plurality of flexing discs 92 and the size of the plurality of compression passages 270 will determine the damping characteristics for shock absorber 20 in compression. As the velocity of piston assembly 232 increases further, the fluid pressure within lower working chamber 246 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the plurality of disc springs 88 to move axially along the outer diameter of guiding sleeve 84 to fully open compression passages 270 creating a third fluid flow.

Rebound valve assembly 64 comprises guiding sleeve 84, valve interface 86, the plurality of disc springs 88, the plurality of shim discs 90 and the plurality of flexing discs 92. Guiding sleeve 84 is slidingly or threadingly received on piston rod 234 and is disposed between valve body 260 and nut 268. Valve interface 86, the plurality of disc springs 88, the plurality of shim discs 90 and the plurality of flexing discs 92 are all slidingly received on the outside diameter of guiding sleeve 84. Valve interface 86 directly engages nut 268, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 260.

Valve interface 86 provides support for the plurality of disc springs 88, the plurality of shim discs 90 and the plurality of flexing discs 92. The plurality of disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include an orifice disc 94 directly abutting valve body 260, one or more tuned discs 96 and a fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 232. The number, diameter and thickness of the one or more tuned discs 96 controls the transition between low and medium velocities of piston assembly 232. Orifice disc 94 and the one or more tuned discs 96 will defect or bend at fulcrum disc 98 to allow a second or additional fluid flow at the medium velocities of piston assembly 232. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 32 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a rebound stroke, fluid in upper working chamber 244 is pressurized causing fluid pressure to react against the plurality of flexing discs 92. An initial flow of fluid will flow through orifice 100 in orifice disc 94 at low velocities of piston assembly 232. As the velocity of piston assembly 232 increases, fluid pressure reacting against the plurality of flexing discs 92 increases and eventually overcomes the bending load for the plurality of flexing discs 92 and the plurality of flexing discs 92 elastically deflect opening the plurality of rebound passages 272 allowing fluid flow from upper working chamber 244 to lower working chamber 246. The design and strength of the plurality of flexing discs 92 and the size of the plurality of rebound passages 272 will determine the damping characteristics for shock absorber 220 in rebound. As the velocity of piston assembly 232 increases further, the fluid pressure within upper working chamber 244 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the plurality of disc springs 88 to move axially along the outer diameter of guiding sleeve 84 fully opening rebound passages 272 creating a third fluid flow.

As illustrated in FIG. 6, rebound valve assembly 64 can incorporate a high speed restriction disc 74 and a shim disc 76. High speed restriction disc 74 is designed to limit the amount of fluid flow through the plurality of rebound passages 272. The use of high speed restriction disc 74 allows the use of a single valve body 260 for any number of piston assemblies 232 where the high speed fluid flow and thus the damping characteristics during the high speed fluid flow in rebound are controlled by the size of high speed restriction disc 74. High speed restriction disc 74 can be incorporated into rebound valve assembly 64 illustrated in FIG. 3.

Referring now to FIGS. 6 and 7, high speed restriction disc 74 is illustrated in more detail. High speed restriction disc 74 is an annular disc which is disposed in direct contact with valve body 260. As illustrated in FIGS. 6 and 7, high speed restriction disc 74 extends over rebound passages 272 to provide a controlled slot area 274. Controlled slot area 274 defines the size of the opening for each of the plurality of rebound passages 272 which controls the high speed fluid flow and thus the damping characteristics during the high speed fluid flow.

Referring now to FIGS. 6 and 8, a high speed restriction disc 74' is illustrated in more detail. High speed restriction disc 74' is shown in phantom in FIG. 6. High speed restriction disc 74' is located on the opposite side or compression side of valve body 260 and high speed restriction disc 74' includes an annular portion 280 and a plurality of tabs 282 extending radially outward from annular portion 280. High speed restriction disc 74' is disposed in direct contact with valve body 260. As illustrated in FIGS. 6 and 8, each of the plurality of tabs 282 extends over a respective rebound passage 272 to provide a controlled slot area 284. Controlled slot area 284 defines the size of the opening for each of the plurality of rebound passages 272 which controls the high speed fluid flow and thus the damping characteristics during the high speed fluid flow.

While controlled slot area 284 is illustrated as being the same size for each of the plurality of rebound passages 272, it is within the scope of the present invention to have different sizes for one or more of the plurality of rebound passages 272.

Figure 9:
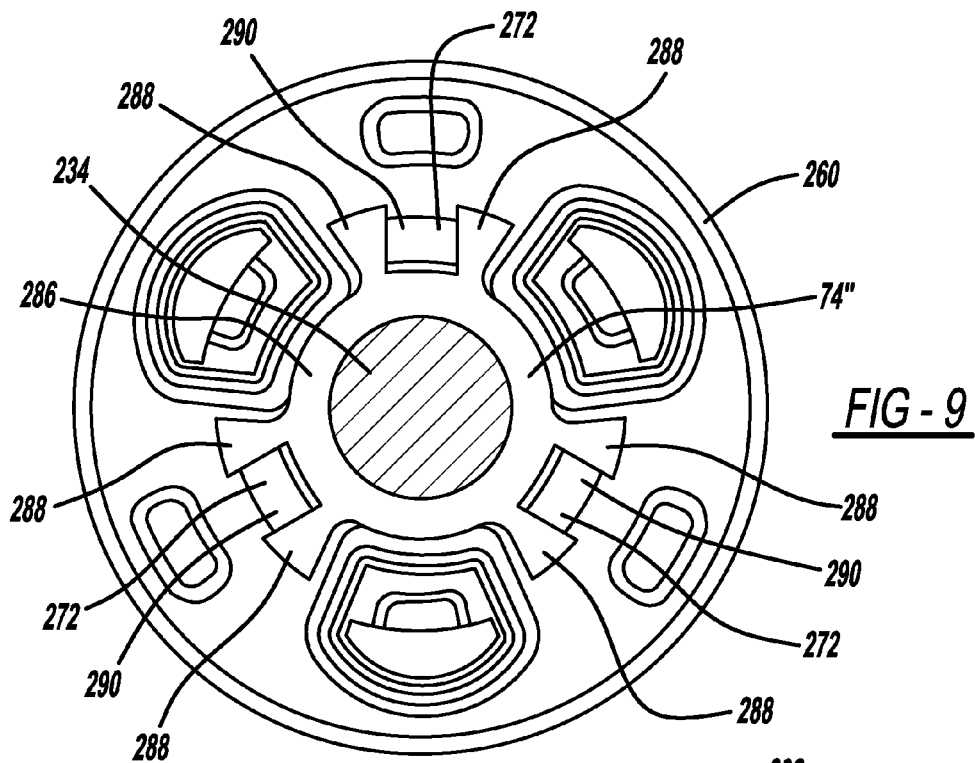
FIG. 9 is a plan view of the valve body including a high speed restriction disc in accordance with another embodiment of the disclosure.

Referring now to FIGS. 6 and 9, a high speed restriction disc 74" is illustrated in more detail. High speed restriction disc 74" is shown in phantom in FIG. 6. High speed restriction disc 74" is located on the opposite side or compression side of valve body 260 and high speed restriction disc 74" includes an annular portion 286 and a plurality of tabs 288 extending radially outward from annular portion 286. High speed restriction disc 74" is disposed in direct contact with valve body 260. As illustrated in FIGS. 6 and 9, a pair of tabs 288 extend over opposite ends of a respective rebound passage 272 to provide a controlled slot area 290. Controlled slot area 290 defines the size of the opening of each of the plurality of rebound passages 272 which controls the high speed fluid flow and thus the damping characteristics during the high speed fluid flow. While controlled slot area 290 is illustrated as being the same size for each of the plurality of rebound passages 272, it is within the scope of the present invention to have different sizes for one or more of the plurality of rebound passages 272.

Figure 10:
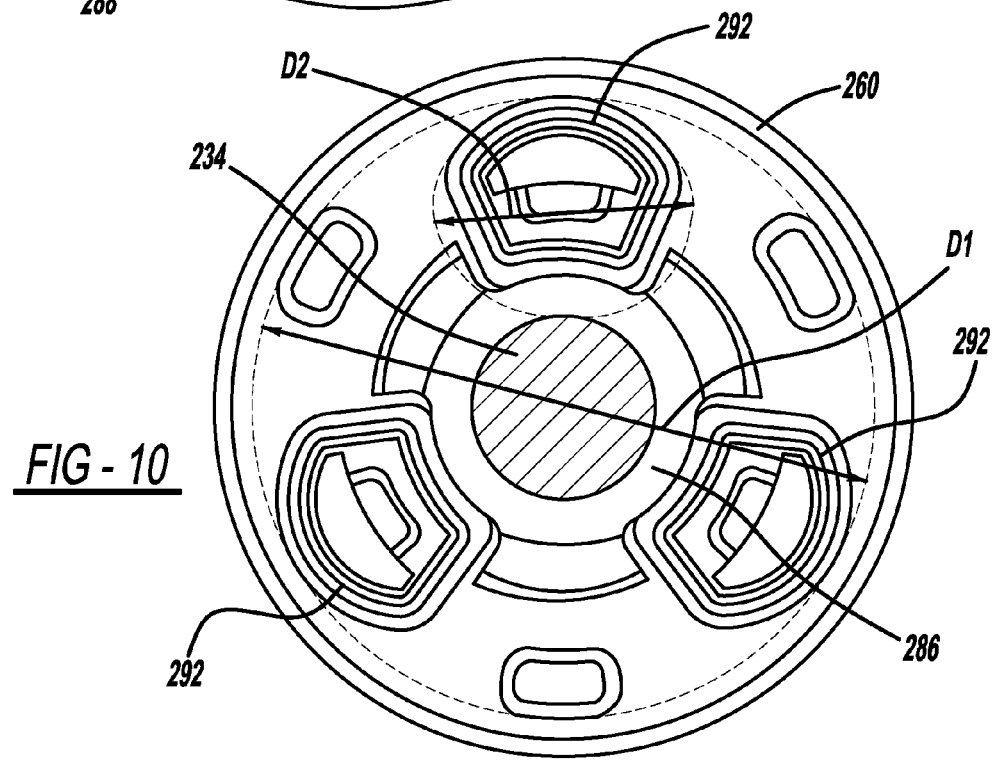
FIG. 10 is a plan view of the piston body illustrating the shape of the sealing lands on the valve body.

Referring now to FIG. 10, a top view of valve body 260 is illustrated showing the compression side of valve body 260. Each of the plurality of compression passages 270 is surrounded by a single land 292. Orifice disc 94 of the plurality of flexing discs 92 directly engages each of the single lands 292. Thus, if orifice 100 is included on compression valve assembly 114, orifice 100 can be included in one or more areas of orifice disc 94 in the area engaging a respective sealing land 292 or one or more sealing lands 292 can include orifice 100.

As illustrated in FIG. 10, the radial outermost portion of each sealing land 292 defines a diameter D1. Each sealing land 292 on its radially outermost portion defines a diameter D2. Thus, each sealing land 292 is not aligned or parallel with the outer diameter of valve body 260. This construction creates a smoother opening or closing of flexing discs 92 and results in less pressure peaks during opening or closing. This provides compression valve assembly 114 with an improved compromise between comfort and Noise, Vibration and Harshness (NVH).

Figure 11A:
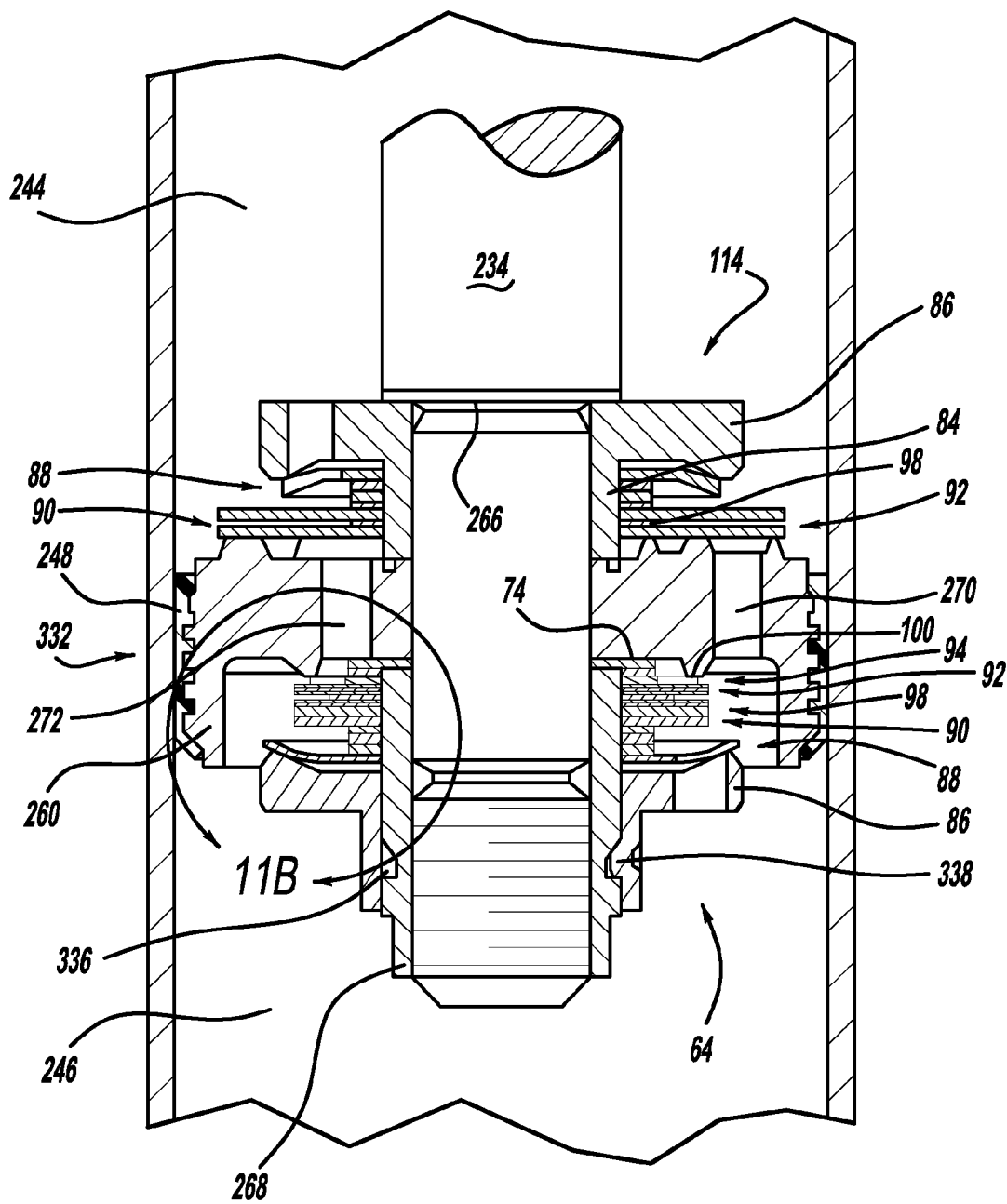
FIG. 11A is a side view partially in cross-section of a piston assembly in accordance with another embodiment of the present disclosure.
Figure 11B:
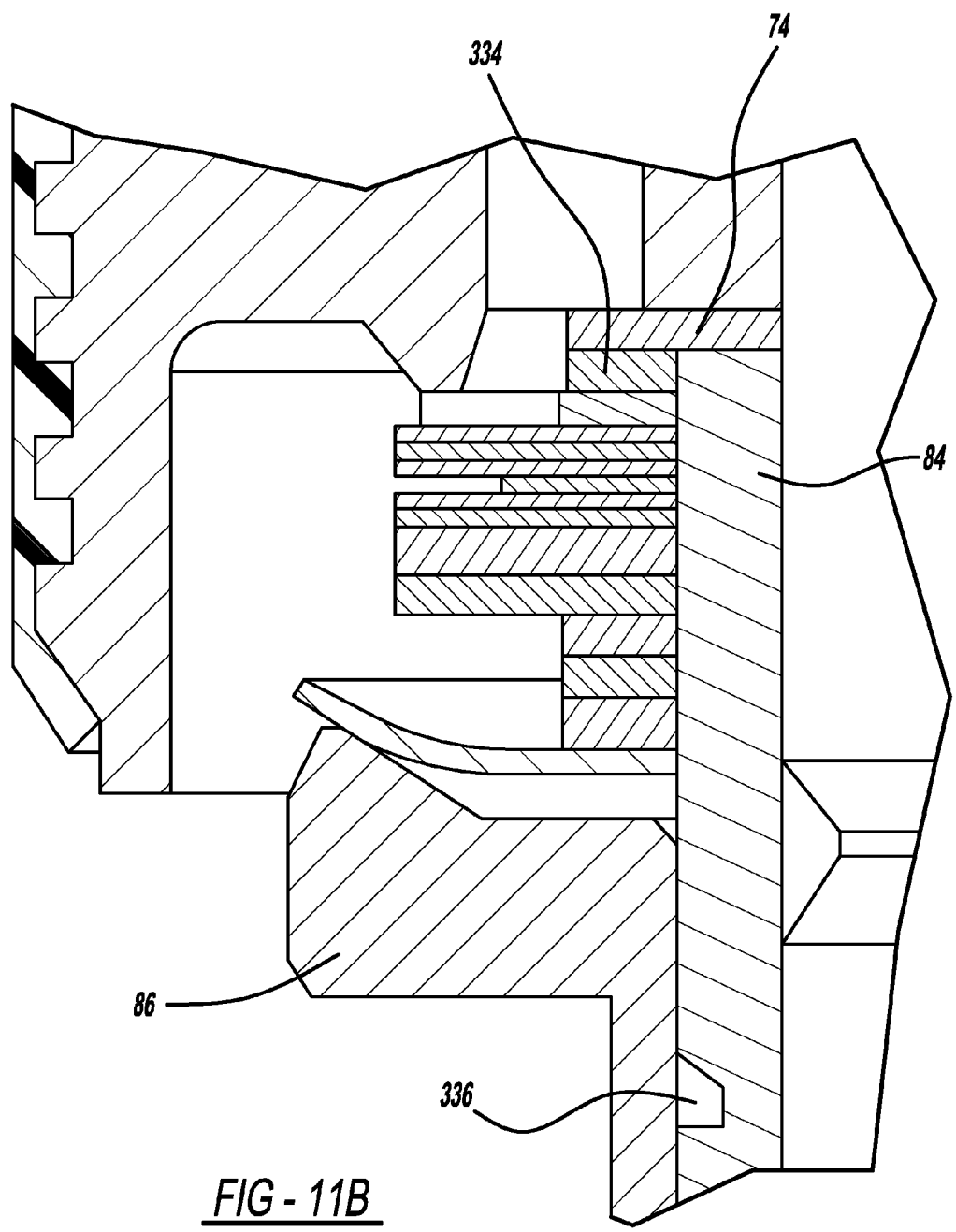
FIG. 11B is an enlarged view of circle 11B illustrated in FIG. 11A.

Referring now to FIGS. 11A and 11B, a piston assembly 332 is illustrated. Piston assembly 332 is a direct replacement for piston assembly 232 illustrated in FIGS. 5 and 6. Piston assembly 332 comprises valve body 260, compression valve assembly 114 and rebound valve assembly 64. Compression valve assembly 114 is assembled against shoulder 266 on piston rod 234. Valve body 260 is assembled against compression valve assembly 114 and rebound valve assembly 64 is assembled against valve body 260. A nut 268 secures these components to piston rod 234.

Valve body 260 defines the plurality of compression passages 270 and the plurality of rebound passages 272. Seal 248 includes the plurality of ribs which mate with the plurality of annular grooves to permit sliding movement of piston assembly 332.

Compression valve assembly 114 comprises guiding sleeve 84, valve interface 86, one or more disc springs 88, the plurality of shim discs 90 and the plurality of flexing discs 92. As illustrated, guiding sleeve 84 and valve interface 86 are a single component. Guiding sleeve 84 is slidingly or threadingly received on piston rod 234 and is disposed between shoulder 266 on piston rod 234 and valve body 260. The one or more disc springs 88, the plurality of shim discs 90 and the plurality of flexing discs 92 are all slidingly received on the outside diameter of guiding sleeve 84. Valve interface 86 directly engages shoulder 266, the one or more disc springs 88 directly engage valve interface 86, the plurality of shim discs 90 directly engage the one or more disc springs 88 and the plurality of flexing discs 92 directly engage the plurality of shim discs 90 and directly engage valve body 260.

Valve interface 86 provides support for the one or more disc springs 88, the plurality of shim discs 90 and the plurality of flexing discs 92. The plurality of disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 332. The number, diameter and thickness of the one or more tuned discs 96 controls the transition between low and medium velocities of piston assembly 332. Orifice disc 94 and the one or more tuned discs 96 will defect or bend to allow a second or additional fluid flow at the medium velocities of piston assembly 332. The plurality of flexing discs 92 combine with the preload force control of the plurality of disc springs 88 to control the lift-off point of the plurality of disc springs 88, the plurality of shim discs 90 and the plurality of flexing discs 92. A third or additional fluid flow at higher velocities of piston assembly 332 will occur when the plurality of flexing discs 92 move axially along guiding sleeve 84 due to the elastic deflection of the plurality of disc springs 88 as the inner diameter of the plurality of disc springs 88 move axially along guiding sleeve 84 while the outside diameter is held in position by valve interface 86.

During a compression stroke, fluid in lower working chamber 246 is pressurized causing fluid pressure to react against the plurality of flexing discs 92. A first or initial flow of fluid will flow through orifice 100 in orifice disc 94 at low velocities of piston assembly 332. As the velocity of piston assembly 332 increases, fluid pressure reacting against the plurality of flexing discs 92 increases and eventually overcomes the bending load for the plurality of flexing discs 92 and the plurality of flexing discs 92 elastically deflect opening the plurality of compression passages 270 allowing a second fluid flow from lower working chamber 246 to upper working chamber 244. The design and strength of the plurality of flexing discs 92 and the size of the plurality of compression passages 270 will determine the damping characteristics for shock absorber 220 in compression. As the velocity of piston assembly 332 increases further, the fluid pressure within lower working chamber 246 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of guiding sleeve 84 to fully open compression passages 270 creating a third fluid flow.

Rebound valve assembly 64 comprises nut 268, valve interface 86, the one or more disc springs 88, the plurality of shim discs 90, the plurality of flexing discs 92 and high speed restriction disc 74. Nut 268 is threadingly received on piston rod 234 and directly engages high speed restriction disc 74. Valve interface 86, the plurality of disc springs 88, the plurality of shim discs 90 and the plurality of flexing discs 92 are all slidingly received on the outside diameter of nut 268. Valve interface 86 directly engages the one or more disc springs 88, the plurality of shim discs 90 directly engage the plurality of disc springs 88 and the plurality of flexing discs 92 directly engage the plurality of shim discs 90 and directly engage valve body 260.

Valve interface 86 provides support for the one or more disc springs 88, the plurality of shim discs 90 and the plurality of flexing discs 92. The one or more disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 232. The number, diameter and thickness of the one or more tuned discs 96 controls the transition between low and medium velocities of piston assembly 332. Orifice disc 94 and the one or more tuned discs 96 will defect or bend at fulcrum disc 98 to allow a second or additional fluid flow at the medium velocities of piston assembly 232. The plurality of flexing discs 92 combine with the preload force control of the one or more disc springs 88 to control the lift-off point of the one or more disc springs 88, the plurality of shim discs 90 and the plurality of flexing discs 92. A third or additional fluid flow at higher velocities of piston assembly 332 will occur when the plurality of flexing discs 92 move axially along nut 268 due to the elastic deflection of the one or more disc springs 88 as the inner diameter of the one or more disc springs 88 move axially along nut 268 while the outside diameter is held in position by valve interface 86.

During a rebound stroke, fluid in upper working chamber 244 is pressurized causing fluid pressure to react against the plurality of flexing discs 92. An initial flow of fluid will flow through orifice 100 in orifice disc 94 at low velocities of piston assembly 332. As the velocity of piston assembly 332 increases, fluid pressure reacting against the plurality of flexing discs 92 increases and eventually overcomes the bending load for the plurality of flexing discs 92 and the plurality of flexing discs 92 elastically deflect opening the plurality of rebound passages 272 allowing fluid flow from upper working chamber 244 to lower working chamber 246. The design and strength of the plurality of flexing discs 92 and the size of the plurality of rebound passages 272 will determine the damping characteristics for shock absorber 220 in rebound. As the velocity of piston assembly 332 increases further, the fluid pressure within upper working chamber 244 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of nut 268 fully opening rebound passages 272 creating a third fluid flow.

As illustrated in FIGS. 11A and 11B, valve interface 86 is slidingly received on nut 268. A shim disc 334 is disposed between the plurality of flexing discs 92 and high speed restriction disc 74. While shim disc 76 is illustrated in FIG. 6 as being between guiding sleeve 84 and high speed restriction disc 74, shim disc 334 can be slidingly received on guiding sleeve 84 as illustrated in FIG. 11B. The design illustrated in FIGS. 11A and 11B allows for an in-line crimping process for the preload adjustment of rebound valve assembly 64. The preload for the one or more disc springs 88, the plurality of shim discs 90 and the plurality of flexing discs 92 can be set by adjusting the axial position of valve interface 86 along nut 268. Once the desired or specified preload is obtained, a crimping operation can be performed by crimping a portion of valve interface 86 into a groove 336 defined by nut 268 to produce a crimp 338 which fixedly secures valve interface 86 to nut 268.

Figure 12:
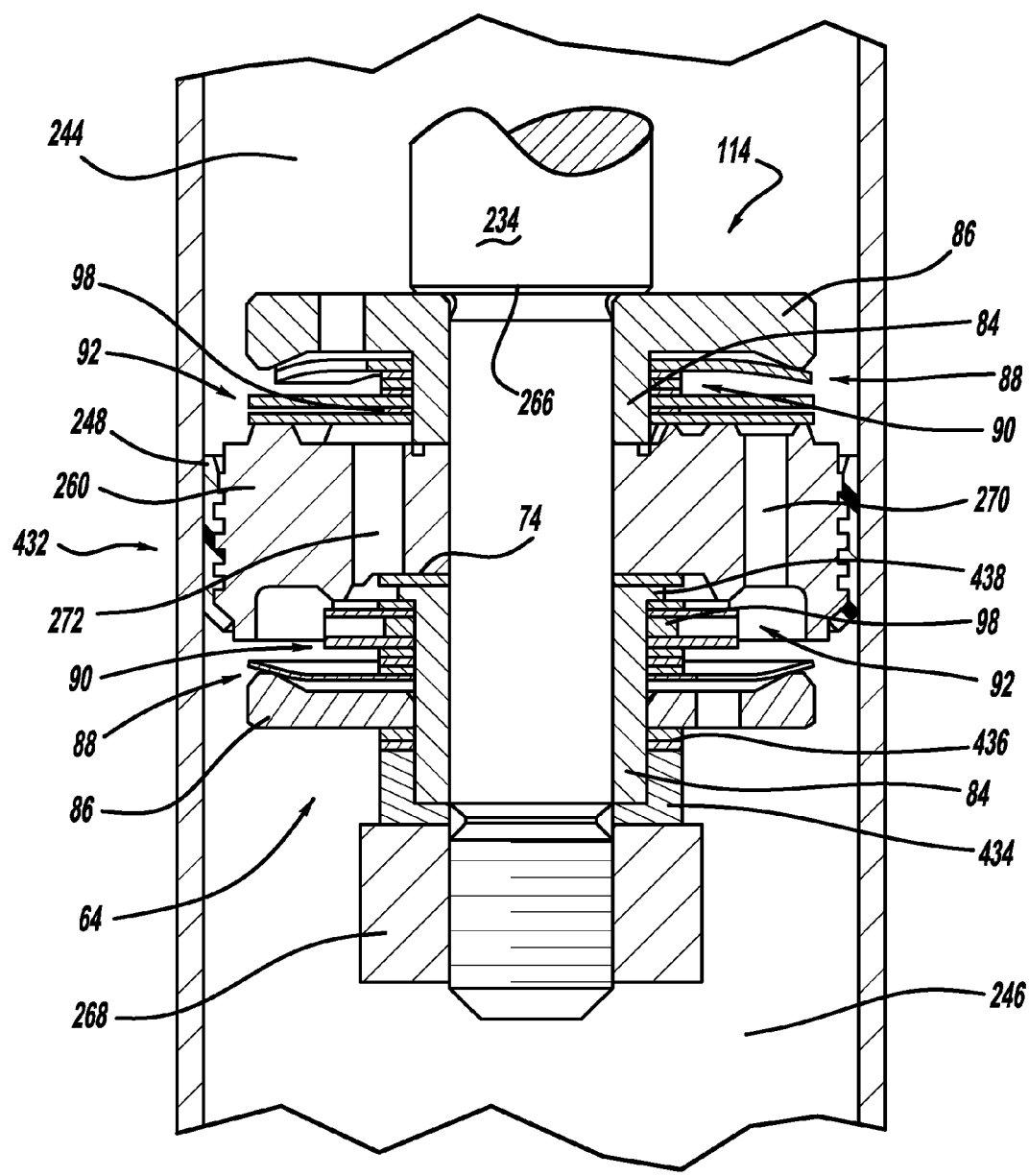
FIG. 12 is a side view partially in cross-section of a piston assembly in accordance with another embodiment of the present disclosure.

Referring now to FIG. 12, a piston assembly 432 is illustrated. Piston assembly 432 is a direct replacement for piston assembly 232 illustrated in FIGS. 5 and 6. Piston assembly 432 comprises valve body 260, compression valve assembly 114 and rebound valve assembly 64. Compression valve assembly 114 is assembled against shoulder 266 on piston rod 234. Valve body 260 is assembled against compression valve assembly 114 and rebound valve assembly 64 is assembled against valve body 260. A nut 268 secures these components to piston rod 234.

Valve body 260 defines the plurality of compression passages 270 and the plurality of rebound passages 272. Seal 248 includes the plurality of ribs which mate with the plurality of annular grooves to permit sliding movement of piston assembly 432.

Compression valve assembly 114 comprises guiding sleeve 84, valve interface 86, the one or more disc springs 88, the plurality of shim discs 90 and the plurality of flexing discs 92. As illustrated, guiding sleeve 84 and valve interface 86 are a single component. Guiding sleeve 84 is slidingly or threadingly received on piston rod 234 and is disposed between shoulder 266 on piston rod 234 and valve body 260. The one or more disc springs 88, the plurality of shim discs 90 and the plurality of flexing discs 92 are all slidingly received on the outside diameter of guiding sleeve 84. Valve interface 86 directly engages shoulder 266, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 260.

Valve interface 86 provides support for the plurality of disc springs 88, the plurality of shim discs 90 and the plurality of flexing discs 92. The plurality of disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 432. The number, diameter and thickness of the one or more tuned discs 96 controls the transition between low and medium velocities of piston assembly 432. Orifice disc 94 and the one or more tuned discs 96 will defect or bend to allow a second or additional fluid flow at the medium velocities of piston assembly 432. The plurality of flexing discs 92 combine with the preload force control of the one or more disc springs 88 to control the lift-off point of the one or more disc springs 88, the plurality of shim discs 90 and the plurality of flexing discs 92. A third or additional fluid flow at higher velocities of piston assembly 432 will occur when the plurality of flexing discs 92 move axially along guiding sleeve 84 due to the elastic deflection of the one or more disc springs 88 as the inner diameter of the one or more disc springs 88 move axially along guiding sleeve 84 while the outside diameter is held in position by valve interface 86.

During a compression stroke, fluid in lower working chamber 246 is pressurized causing fluid pressure to react against the plurality of flexing discs 92. A first or initial flow of fluid will flow through orifice 100 in orifice disc 94 at low velocities of piston assembly 432. As the velocity of piston assembly 432 increases, fluid pressure reacting against the plurality of flexing discs 92 increases and eventually overcomes the bending load for the plurality of flexing discs 92 and the plurality of flexing discs 92 elastically deflect opening the plurality of compression passages 270 allowing a second fluid flow from lower working chamber 246 to upper working chamber 244. The design and strength of the plurality of flexing discs 92 and the size of the plurality of compression passages 270 will determine the damping characteristics for shock absorber 220 in compression. As the velocity of piston assembly 432 increases further, the fluid pressure within lower working chamber 246 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of guiding sleeve 84 to fully open compression passages 270 creating a third fluid flow.

Rebound valve assembly 64 comprises guiding sleeve 84, valve interface 86, the one or more disc springs 88, the plurality of shim discs 90, the plurality of flexing discs 92 and high speed restriction disc 74. Guiding sleeve 84 is slidingly or threadingly received on piston rod 234 and is disposed between high speed restriction disc 74 and a cap 434. Valve interface 86, the one or more disc springs 88, the plurality of shim discs 90 and the plurality of flexing discs 92 are all slidingly received on the outside diameter of guiding sleeve 84. Cap 434 directly engages nut 268, valve interface 86 directly engages one or more shims 436 which directly engage cap 434, the plurality of disc springs 88 directly engage valve interface 86, the plurality of shim discs 90 directly engage the plurality of disc springs 88 and the plurality of flexing discs 92 directly engage the plurality of shim discs 90 and directly engage valve body 260. High speed restriction disc 74 is disposed between guiding sleeve 84 and valve body 260.

Valve interface 86 provides support for the one or more disc springs 88, the plurality of shim discs 90 and the plurality of flexing discs 92. The one or more disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 232. The number, diameter and thickness of the one or more tuned discs 96 controls the transition between low and medium velocities of piston assembly 432. Orifice disc 94 and the one or more tuned discs 96 will defect or bend at fulcrum disc 98 to allow a second or additional fluid flow at the medium velocities of piston assembly 432. The plurality of flexing discs 92 combine with the preload force control of the one or more disc springs 88 to control the lift-off point of the one or more disc springs 88, the plurality of shim discs 90 and the plurality of flexing discs 92. A third or additional fluid flow at higher velocities of piston assembly 432 will occur when the plurality of flexing discs 92 move axially along guiding sleeve 84 due to the elastic deflection of the one or more disc springs 88 as the inner diameter of the one or more disc springs 88 move axially along guiding sleeve 84 while the outside diameter is held in position by valve interface 86.

During a rebound stroke, fluid in upper working chamber 244 is pressurized causing fluid pressure to react against the plurality of flexing discs 92. An initial flow of fluid will flow through orifice 100 in orifice disc 94 at low velocities of piston assembly 432. As the velocity of piston assembly 432 increases, fluid pressure reacting against the plurality of flexing discs 92 increases and eventually overcomes the bending load for the plurality of flexing discs 92 and the plurality of flexing discs 92 elastically deflect opening the plurality of rebound passages 272 allowing fluid flow from upper working chamber 244 to lower working chamber 246. The design and strength of the plurality of flexing discs 92 and the size of the plurality of rebound passages 272 will determine the damping characteristics for shock absorber 220 in rebound. As the velocity of piston assembly 232 increases further, the fluid pressure within upper working chamber 244 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of guiding sleeve 84 fully opening rebound passages 272 creating a third fluid flow.

Piston assembly 432 allows for the pre-assembly of rebound valve assembly 64 at an off-line and/or off-site location. Guiding sleeve 84 includes a radially inner extending flange 438 against which the plurality of flexing discs 92 directly engage. At the off-site location, the plurality of flexing discs 92 are assembled over guiding sleeve 84. Then the plurality of shim discs 90 are assembled over guiding sleeve 84. Then the one or more disc springs 88 are assembled over guiding sleeve 84. Valve interface 86 is assembled over guiding sleeve 84. The proper thickness of plurality of shims 436 are assembled over guiding sleeve 84 and cap 434 is press fit or otherwise secured to valve interface 86. The thickness of the plurality of shims 436 determines the load applied to the plurality of flexing discs 92. In this manner, guiding sleeve 84 with the remainder of the components of rebound valve assembly 64 can be transferred to the shock absorber assembly line as a pre-assembled rebound valve assembly 64.

Figure 13:
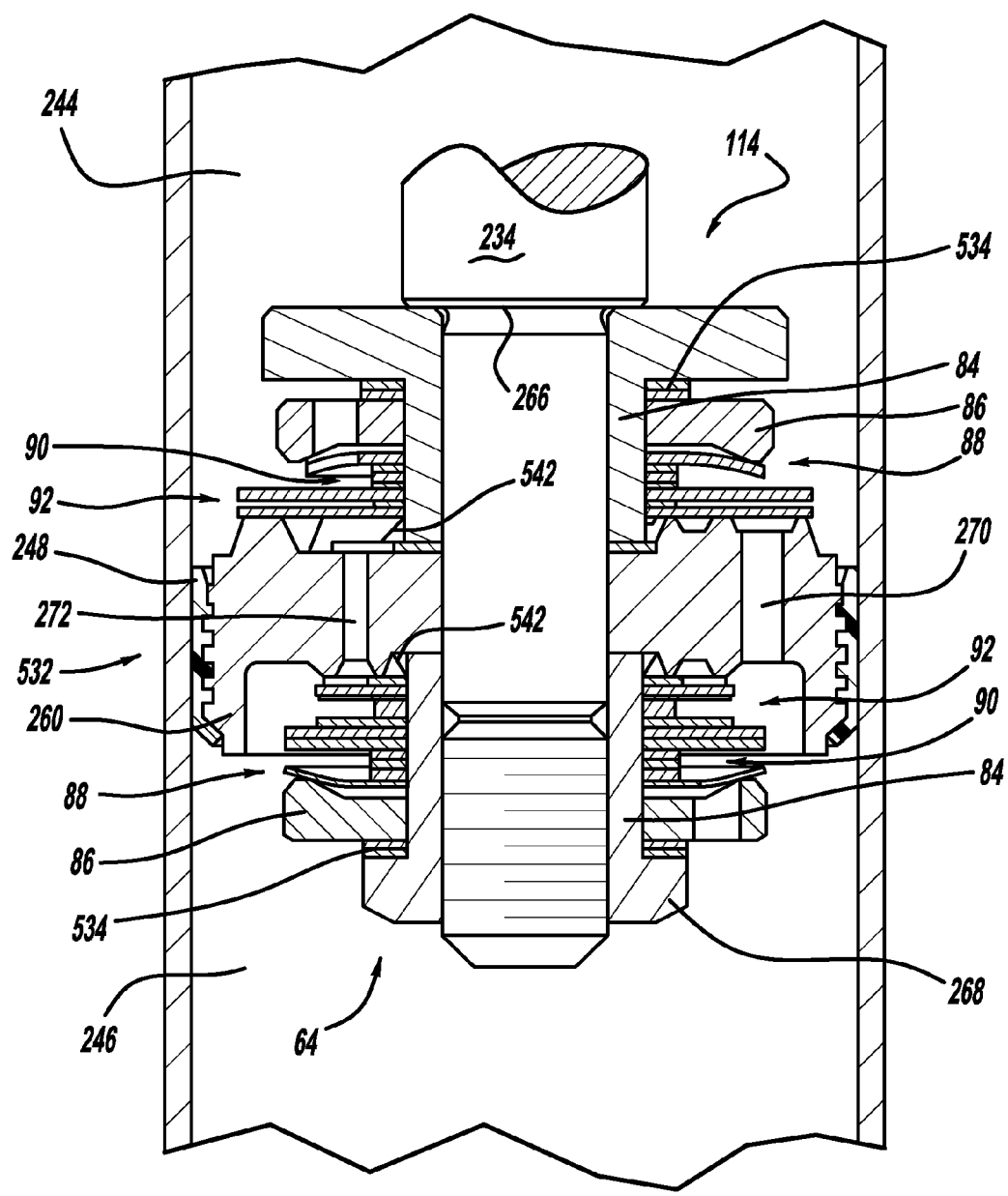
FIG. 13 is a side view partially in cross-section of a piston assembly in accordance with another embodiment of the present disclosure.

Referring now to FIG. 13, a piston assembly 532 is illustrated. Piston assembly 532 is a direct replacement for piston assembly 232 illustrated in FIGS. 5 and 6. Piston assembly 532 comprises valve body 260, compression valve assembly 114 and rebound valve assembly 64. Compression valve assembly 114 is assembled against shoulder 266 on piston rod 234. Valve body 260 is assembled against compression valve assembly 114 and rebound valve assembly 64 is assembled against valve body 260. A nut 268 secures these components to piston rod 34.

Valve body 260 defines the plurality of compression passages 270 and the plurality of rebound passages 272. Seal 248 includes the plurality of ribs which mate with the plurality of annular grooves to permit sliding movement of piston assembly 532.

Compression valve assembly 114 comprises guiding sleeve 84, valve interface 86, the one or more disc springs 88, the plurality of shim discs 90 and the plurality of flexing discs 92. Guiding sleeve 84 is slidingly or threadingly received on piston rod 234 and is disposed between shoulder 266 on piston rod 234 and valve body 260. The one or more disc springs 88, the plurality of shim discs 90 and the plurality of flexing discs 92 are all slidingly received on the outside diameter of guiding sleeve 84. Guiding sleeve 84 directly engages shoulder 266, the one or more disc springs 88 directly engage valve interface 86, the plurality of shim discs 90 directly engage the one or more disc springs 88 and the plurality of flexing discs 92 directly engage the plurality of shim discs 90 and directly engage valve body 260.

Valve interface 86 provides support for the plurality of disc springs 88, the plurality of shim discs 90 and the plurality of flexing discs 92. The one or more disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 532. The number, diameter and thickness of the one or more tuned discs 96 controls the transition between low and medium velocities of piston assembly 532. Orifice disc 94 and the one or more tuned discs 96 will defect or bend to allow a second or additional fluid flow at the medium velocities of piston assembly 532. The plurality of flexing discs 92 combine with the preload force control of the plurality of disc springs 88 to control the lift-off point of the one or more disc springs 88, the plurality of shim discs 90 and the plurality of flexing discs 92. A third or additional fluid flow at higher velocities of piston assembly 532 will occur when the plurality of flexing discs 92 move axially along guiding sleeve 84 due to the elastic deflection of the one or more disc springs 88 as the inner diameter of the one or more disc springs 88 move axially along guiding sleeve 84 while the outside diameter is held in position by valve interface 86.

During a compression stroke, fluid in lower working chamber 246 is pressurized causing fluid pressure to react against the plurality of flexing discs 92. A first or initial flow of fluid will flow through orifice 100 in orifice disc 94 at low velocities of piston assembly 532. As the velocity of piston assembly 532 increases, fluid pressure reacting against the plurality of flexing discs 92 increases and eventually overcomes the bending load for the plurality of flexing discs 92 and the plurality of flexing discs 92 elastically deflect opening the plurality of compression passages 270 allowing a second fluid flow from lower working chamber 246 to upper working chamber 244. The design and strength of the plurality of flexing discs 92 and the size of the plurality of compression passages 270 will determine the damping characteristics for shock absorber 220 in compression. As the velocity of piston assembly 532 increases further, the fluid pressure within lower working chamber 246 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of guiding sleeve 84 to fully open compression passages 270 creating a third fluid flow.

Rebound valve assembly 64 comprises guiding sleeve 84, valve interface 86, the one or more disc springs 88, the plurality of shim discs 90 and the plurality of flexing discs 92. Guiding sleeve 84 is slidingly or threadingly received on piston rod 234 and is disposed between valve body 260 and nut 268. As illustrated, guiding sleeve 84 is illustrated as being integral or one piece with nut 268. Valve interface 86, the one or more disc springs 88, the plurality of shim discs 90 and the plurality of flexing discs 92 are all slidingly received on the outside diameter of guiding sleeve 84. The plurality of disc springs 88 directly engage valve interface 86, the plurality of shim discs 90 directly engage the one or more disc springs 88 and the plurality of flexing discs 92 directly engage the plurality of shim discs 90 and directly engage valve body 260.

Valve interface 86 provides support for the one or more disc springs 88, the plurality of shim discs 90 and the plurality of flexing discs 92. The one or more disc springs 88 flex or bend to provide a specified load which biases the plurality of flexing discs 92 against valve body 260. The plurality of shim discs 90 are provided to adjust or determine the amount of flexing of the plurality of flexing discs 92 and thus they adjust or determine the amount of the specified load which biases the plurality of flexing discs 92 against valve body 260.

The plurality of flexing discs 92 include orifice disc 94 directly abutting valve body 260, the one or more tuned discs 96 and fulcrum disc 98. When fluid pressure is applied to the plurality of flexing discs 92, a first or initial flow of fluid will flow through optional orifice 100 defined by orifice disc 94 or valve body 260. This first or initial flow of fluid is used to tune the low speed damping and can control the steepness of the force versus velocity curve at low velocities of piston assembly 532. The number, diameter and thickness of the one or more tuned discs 96 controls the transition between low and medium velocities of piston assembly 532. Orifice disc 94 and the one or more tuned discs 96 will defect or bend at fulcrum disc 98 to allow a second or additional fluid flow at the medium velocities of piston assembly 532. The plurality of flexing discs 92 combine with the preload force control of the one or more disc springs 88 to control the lift-off point of the one or more disc springs 88, the plurality of shim discs 90 and the plurality of flexing discs 92. A third or additional fluid flow at higher velocities of piston assembly 532 will occur when the plurality of flexing discs 92 move axially along guiding sleeve 84 due to the elastic deflection of the one or more disc springs 88 as the inner diameter of the one or more disc springs 88 move axially along guiding sleeve 84 while the outside diameter is held in position by valve interface 86.

During a rebound stroke, fluid in upper working chamber 244 is pressurized causing fluid pressure to react against the plurality of flexing discs 92. An initial flow of fluid will flow through orifice 100 in orifice disc 94 at low velocities of piston assembly 532. As the velocity of piston assembly 532 increases, fluid pressure reacting against the plurality of flexing discs 92 increases and eventually overcomes the bending load for the plurality of flexing discs 92 and the plurality of flexing discs 92 elastically deflect opening the plurality of rebound passages 272 allowing fluid flow from upper working chamber 244 to lower working chamber 246. The design and strength of the plurality of flexing discs 92 and the size of the plurality of rebound passages 272 will determine the damping characteristics for shock absorber 220 in rebound. As the velocity of piston assembly 532 increases further, the fluid pressure within upper working chamber 244 reaches a predetermined level and the fluid pressure will cause the plurality of flexing discs 92 to lift-off of valve body 260. The lift-off of the plurality of flexing discs 92 causes the plurality of flexing discs 92, the plurality of shim discs 90 and the one or more disc springs 88 to move axially along the outer diameter of guiding sleeve 84 fully opening rebound passages 272 creating a third fluid flow.

Piston assembly 532 allows for the pre-assembly of compression valve assembly 114 and the pre-assembly of rebound valve assembly 64 at an off-line and/or off-site location. At the time of assembly of compression valve assembly 114, the proper thickness of a plurality of shims 534 are assembled over guiding sleeve 84. Then, valve interface 86 is assembled over guiding sleeve 84. Then, the one or more disc springs 88 are assembled over guiding sleeve 84. Then, the plurality of shim discs 90 are assembled over guiding sleeve 84. Then the plurality of flexing discs 92 are assembled over guiding sleeve 84. Guiding sleeve 84 is then crimped or otherwise deformed as illustrated at 542 to maintain the assembly of compression valve assembly 114. The thickness of the plurality of shims 534 determines the load applied to the plurality of flexing discs 92. In this manner, guiding sleeve 84 with the remainder of the components of compression valve assembly 114 can be transferred to the shock absorber assembly line as a pre-assembled compression valve assembly 114.

In a similar manner at the time of assembly of rebound valve assembly 64, the proper thickness of the plurality of shims 534 are assembled over guiding sleeve 84. Then, valve interface 86 is assembled over guiding sleeve 84. Then, the one or more disc springs 88 are assembled over guiding sleeve 84. Then, the plurality of shim discs 90 are assembled over guiding sleeve 84. Then the plurality of flexing discs 92 are assembled over guiding sleeve 84. Guiding sleeve 84 is then crimped or otherwise deformed as illustrated at 542 to maintain the assembly of rebound valve assembly 64. The thickness of the plurality of shims 534 determines the load applied to the plurality of flexing discs 92. In this manner, guiding sleeve 84 with the remainder of the components of rebound valve assembly 64 can be transferred to the shock absorber assembly line as a pre-assembled compression valve assembly 114.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A shock absorber comprising:
   a pressure tube defining a fluid chamber;
   a piston assembly disposed within said fluid chamber, said piston assembly dividing said fluid chamber into an upper working chamber and a lower working chamber, said piston assembly defining a piston valve body having a first plurality of fluid passages extending through said piston valve body;
   a first valve assembly attached to said piston assembly, said first valve assembly comprising:
      a first valve disc directly engaging said piston valve body of said piston assembly to close a first one of said first plurality of fluid passages;
      a first biasing member urging said first valve disc towards said piston valve body; and
      a first interface directly engaging said first biasing member; wherein
   said first valve disc is movable between a first position closing said first one of said first plurality of fluid passages, a second position where said first valve disc elastically bends to open said first one of said first plurality of fluid passages and a third position where said entire first valve disc moves away from said piston valve body to fully open said first one of said first plurality of fluid passages;
   said first biasing member is an annular disc defining a central aperture and an outermost circumferential edge spaced radially outward from said central aperture;
   said first interface directly engages said first biasing member at a position immediately adjacent said outermost circumferential edge of said first biasing member;
   said shock absorber further comprising:
   a reserve tube disposed around said pressure tube to define a reserve chamber between said pressure tube and said reserve tube; and
   a base valve assembly disposed between said fluid chamber and said reserve chamber, said base valve assembly including a base valve body defining a second plurality of fluid passages, said base valve assembly comprising:

a second valve disc directly engaging said base valve
   body of said base valve assembly to close a second
   one of said second plurality of fluid passages;
a second biasing member urging said second valve disc
   towards said base valve body; wherein
said second valve disc is movable between a first position closing said second one of said second plurality of fluid passages, a second position where said second valve disc elastically bends to open said second one of said second plurality of fluid passages and a third position where said entire second valve disc moves away from said base valve body to fully open said second one of said second plurality of fluid passages;
said second biasing member is an annular disc defining a central aperture and an outermost circumferential edge spaced radially from said central aperture of said second biasing member
said first biasing member elastically deflects to allow said entire first valve disc to move away from said piston valve body;
said second biasing member elastically deflects to allow said entire second valve disc to move away from said base valve body;
said first biasing member elastically deflects due to movement of said central aperture of said first biasing member with respect to said outermost circumferential edge of said first biasing member; and
said second biasing member elastically deflects due to movement of an inner portion of said second biasing member with respect to an outer portion of said second biasing member.

2. The shock absorber according to claim 1, wherein the first valve assembly further comprises a first shim disc disposed between said first valve disc and said first biasing member.

3. The shock absorber according to claim 1, wherein said first valve disc defines an orifice creating an always open flow path between said upper working chamber and said lower working chamber.

4. The shock absorber according to claim 1, wherein said first interface maintains a position of said outermost circumferential edge of said first biasing member with respect to said piston valve body during movement of said first valve disc.

5. The shock absorber according to claim 1, further comprising a second valve assembly, said second valve assembly comprising:
   a third valve disc directly engaging said piston valve body of said piston assembly to close a second one of said first plurality of fluid passages;
   a third biasing member urging said third valve disc towards said piston valve body; wherein
   said third valve disc is movable between a first position closing said second one of said first plurality of fluid passages, a second position where said third valve disc elastically bends to open said second one of said first plurality of fluid passages and a third position where said entire third valve disc moves away from said piston valve body to fully open said second one of said first plurality of fluid passages.

6. The shock absorber according to claim 5, wherein said first biasing member elastically deflects to allow said entire first valve disc to move away from said piston valve body; and
   said third biasing member elastically deflects to allow said entire third valve disc to move away from said piston valve body.

7. The shock absorber according to claim 6, wherein said third biasing member elastically deflects due to movement of an inner portion of said third biasing member with respect to an outer portion of said second biasing member.

8. The shock absorber according to claim 5, wherein the first valve assembly further comprises a first shim disc disposed between said first valve disc and said first biasing member; and
   the third valve assembly further comprises a second shim disc disposed between said second third valve disc and said third biasing member.

9. The shock absorber according to claim 5, wherein said second valve assembly further comprises a second valve interface directly engaging said third biasing member.

10. The shock absorber according to claim 9, wherein said first interface maintains a position of said outermost circumferential edge of said first disc spring with respect to said piston valve body during movement of said first valve disc; and
    said third biasing member is a second disc spring, said second valve interface directly engaging an outer portion of said second disc spring to maintain a position of said outer portion of said second disc spring with respect to said piston valve body during movement of said second valve disc.

11. The shock absorber according to claim 1, wherein said first valve assembly further comprises a guiding sleeve, said first valve disc and said first biasing member slidingly engaging said guiding sleeve.

12. The shock absorber according to claim 11, wherein the first valve assembly further comprises a shim disc disposed between said first valve disc and said first biasing member, said shim disc slidingly engaging said guiding sleeve.

13. The shock absorber according to claim 1, wherein the first valve assembly further comprises a first shim disc disposed between said first valve disc and said first biasing member; and
    the second valve assembly further comprises a second shim disc disposed between said second valve disc and said second biasing member.

14. The shock absorber according to claim 1, wherein said second valve assembly further comprises a second valve interface directly engaging said second biasing member.

15. A shock absorber comprising:
    a pressure tube defining a fluid chamber;
    a piston assembly disposed within said fluid chamber, said piston assembly dividing said fluid chamber into an upper working chamber and a lower working chamber, said piston assembly defining a piston valve body having a first plurality of fluid passages extending through said piston valve body;
    a first valve assembly attached to said piston assembly, said first valve assembly comprising:
       a first valve disc directly engaging said piston valve body of said piston assembly to close a first one of said first plurality of fluid passages;
       a first biasing member urging said first valve disc towards said piston valve body; and
       a first interface directly engaging said first biasing member; wherein
    said first valve disc is movable between a first position closing said first one of said first plurality of fluid passages, a second position where said first valve disc elastically bends to open said first one of said first plurality of fluid passages and a third position where said entire first valve disc moves away from said piston valve body to fully open said first one of said first plurality of fluid passages;
said first biasing member is an annular disc defining a central aperture and an outermost circumferential edge spaced radially outward from said central aperture;
said first interface directly engages said first biasing member at a position immediately adjacent said outermost circumferential edge of said first biasing member; said shock absorber further comprising:
a reserve tube disposed around said pressure tube to define a reserve chamber between said pressure tube and said reserve tube; and
a base valve assembly disposed between said fluid chamber and said reserve chamber, said base valve assembly including a base valve body defining a second plurality of fluid passages, said base valve assembly comprising:
  a second valve disc directly engaging said base valve body of said base valve assembly to close a second one of said second plurality of fluid passages;
  a second biasing member urging said second valve disc towards said base valve body; wherein
  said second valve disc is movable between a first position closing said second one of said second plurality of fluid passages, a second position where said second valve disc elastically bends to open said second one of said second plurality of fluid passages and a third position where said entire second valve disc moves away from said base valve body to fully open said second one of said second plurality of fluid passages;
  said second valve assembly further comprises a second valve interface directly engaging said second biasing member;
said first interface maintains a position of said outermost circumferential edge of said first disc spring with respect to said piston valve body during movement of said first valve disc; and
said second biasing member is a second disc spring, said second valve interface directly engaging an outer portion of said second disc spring to maintain a position of said outer portion of said second disc spring with respect to said base valve body during movement of said second valve disc.

* * * * *

UNITED STATES PATENT AND TRADEMARK OFFICE
CERTIFICATE OF CORRECTION

PATENT NO. : 9,080,629 B2  
APPLICATION NO. : 13/606039  
DATED : July 14, 2015  
INVENTOR(S) : M'Hand Nait Oukhedou et al.

Page 1 of 1

It is certified that error appears in the above-identified patent and that said Letters Patent is hereby corrected as shown below:

In the claims

Col. 22, Claim 8, line 11, after "said" delete "second";

Col. 24, Claim 15, line 17, after "second" delete "valve".

Signed and Sealed this
Eighth Day of December, 2015

Michelle K. Lee
*Director of the United States Patent and Trademark Office*